United States Patent
Liu et al.

(10) Patent No.: US 10,212,574 B2
(45) Date of Patent: Feb. 19, 2019

(54) NEIGHBOR AWARENESS NETWORKING DATAPATH—BASE SCHEDULING, SCHEDULER RANK, AND FURTHER SERVICE DISCOVERY

(71) Applicant: Apple Inc., Cupertino, CA (US)

(72) Inventors: Yong Liu, Campbell, CA (US);
Christiaan A. Hartman, San Jose, CA (US); Daniel R. Borges, San Francisco, CA (US); Peter Heerboth, San Jose, CA (US); Lawrie Kurian, San Jose, CA (US); Su Khiong Yong, Palo Alto, CA (US); Anand Rajagopalan, Saratoga, CA (US); Saravanan Balasubramaniyan, Los Gatos, CA (US); Tashbeeb Haque, San Francisco, CA (US); Andreas Wolf, San Mateo, CA (US); Guoqing Li, Cupertino, CA (US); Lilach Zukerman, Pardesia (IL); Oren Shani, Kfar Saba (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/074,848

(22) Filed: Mar. 18, 2016

(65) Prior Publication Data
US 2016/0278112 A1 Sep. 22, 2016

Related U.S. Application Data

(60) Provisional application No. 62/150,187, filed on Apr. 20, 2015, provisional application No. 62/136,276, filed on Mar. 20, 2015.

(51) Int. Cl.
*H04W 72/12* (2009.01)
*H04W 8/00* (2009.01)
(Continued)

(52) U.S. Cl.
CPC ....... *H04W 8/005* (2013.01); *H04W 72/1278* (2013.01); *H04W 28/18* (2013.01); *H04W 84/12* (2013.01); *H04W 92/18* (2013.01)

(58) Field of Classification Search
CPC . H04W 28/18; H04W 72/1278; H04W 84/12; H04W 8/005; H04W 92/18
See application file for complete search history.

(56) References Cited

U.S. PATENT DOCUMENTS

| | | |
|---|---|---|
| 9,143,979 B1 | 9/2015 | Lambert |
| 9,319,862 B2 | 4/2016 | Kelleman |

(Continued)

FOREIGN PATENT DOCUMENTS

WO    2014124251 A2    8/2014

OTHER PUBLICATIONS

Camps-Mur, "Enabling Always on Service Discovery: WiFi Neighbor Awareness Networking", Apr. 29, 2015, 8 pages, vol. 22, Issue 2, IEEE Wireless Communications.

*Primary Examiner* — Asad M Nawaz
*Assistant Examiner* — Berhanu D Belete
(74) *Attorney, Agent, or Firm* — Meyertons Hood Kivlin Kowert & Goetzel, P.C.; Jeffrey C. Hood

(57) ABSTRACT

In some embodiments, one or more wireless stations operate to configure Neighbor Awareness Networking (NAN)—direct communication between neighboring wireless stations, e.g., without utilizing an intermediate access point. Embodiments of the disclosure relate to NAN datapath configuration. The NAN datapath embodiments described herein provide a mechanism through which devices can communicate and provide services. Aspects of the datapath development include datapath scheduling, including datapath setup and scheduling attributes, scheduler rank management, and further NAN discovery. The datapath model (Continued)

may be implemented for unicast and multicast communication between wireless stations.

20 Claims, 22 Drawing Sheets

(51) Int. Cl.
*H04W 84/12* (2009.01)
*H04W 92/18* (2009.01)
*H04W 28/18* (2009.01)

(56) References Cited

U.S. PATENT DOCUMENTS

| | | | |
|---|---|---|---|
| 9,521,192 B2 | 12/2016 | Qi | |
| 9,544,754 B1 | 1/2017 | Lambert | |
| 9,723,513 B1 | 8/2017 | Lambert | |
| 9,800,389 B2 | 10/2017 | Abraham | |
| 9,872,234 B2* | 1/2018 | Huang | H04W 48/16 |
| 2008/0285507 A1 | 11/2008 | Mukherjee et al. | |
| 2010/0165963 A1 | 7/2010 | Chu | |
| 2010/0226342 A1* | 9/2010 | Colling | H04W 56/002 |
| | | | 370/336 |
| 2013/0034020 A1* | 2/2013 | Morgan | H04W 84/14 |
| | | | 370/255 |
| 2013/0148566 A1* | 6/2013 | Doppler | H04W 72/005 |
| | | | 370/312 |
| 2014/0056248 A1 | 2/2014 | Wang et al. | |
| 2014/0177510 A1* | 6/2014 | Tajima | H04L 12/1881 |
| | | | 370/312 |
| 2014/0269555 A1 | 9/2014 | Sadasivam et al. | |
| 2014/0301190 A1 | 10/2014 | Abraham et al. | |
| 2014/0313966 A1 | 10/2014 | Shukla et al. | |
| 2014/0323110 A1* | 10/2014 | Moon | H04W 76/23 |
| | | | 455/418 |
| 2014/0328168 A1 | 11/2014 | Park et al. | |
| 2014/0357269 A1* | 12/2014 | Zhou | H04W 76/14 |
| | | | 455/434 |
| 2015/0006633 A1 | 1/2015 | Vandwalle et al. | |
| 2015/0036540 A1* | 2/2015 | Kasslin | H04W 48/18 |
| | | | 370/254 |
| 2015/0081840 A1 | 3/2015 | Patil et al. | |
| 2015/0098388 A1 | 4/2015 | Fang | |
| 2015/0109961 A1 | 4/2015 | Patil | |
| 2015/0109981 A1 | 4/2015 | Patil et al. | |
| 2015/0172757 A1 | 6/2015 | Kafle | |
| 2015/0208455 A1* | 7/2015 | Yen | H04W 76/023 |
| | | | 370/329 |
| 2015/0256992 A1 | 9/2015 | Kelleman | |
| 2015/0282149 A1 | 10/2015 | Abraham | |
| 2015/0296458 A1 | 10/2015 | Abraham et al. | |
| 2015/0319029 A1 | 11/2015 | Abraham et al. | |
| 2015/0319235 A1 | 11/2015 | Liu et al. | |
| 2015/0319675 A1* | 11/2015 | Park | H04W 48/16 |
| | | | 370/338 |
| 2015/0341447 A1 | 11/2015 | Patil et al. | |
| 2015/0341811 A1 | 11/2015 | Deshpande et al. | |
| 2015/0350866 A1 | 12/2015 | Patil et al. | |
| 2015/0351146 A1 | 12/2015 | Lee | |
| 2016/0014669 A1* | 1/2016 | Patil | H04W 40/246 |
| | | | 370/329 |
| 2016/0014714 A1 | 1/2016 | Patil et al. | |
| 2016/0029403 A1 | 1/2016 | Roy et al. | |
| 2016/0073288 A1 | 3/2016 | Patil et al. | |
| 2016/0073330 A1* | 3/2016 | Patil | H04L 61/2015 |
| | | | 709/220 |
| 2016/0088611 A1 | 3/2016 | Abraham | |
| 2016/0157089 A1 | 6/2016 | Qi et al. | |
| 2016/0165653 A1 | 6/2016 | Liu et al. | |
| 2016/0241433 A1* | 8/2016 | Huang | H04W 48/16 |
| 2016/0249200 A1 | 8/2016 | Liu et al. | |
| 2016/0309496 A1 | 10/2016 | Huang | |
| 2016/0337836 A1 | 11/2016 | Kim | |
| 2017/0034769 A1 | 2/2017 | Kim | |

* cited by examiner

| Scheduler Ranks | | | | | |
|---|---|---|---|---|---|
| NAN Device | Initial | After First Datapath (datapath A-B) | After Second Datapath (datapath C-D) | After Third Datapath (datapath B-D) | After Update (NAN Devices A and C update) |
| A | X | X+1 | X+1 | X+1 | X+2 |
| B | Y | X+1 | X+1 | X+2 | X+2 |
| C | Z | Z | Z+1 | Z+1 | X+2 |
| D | W | W | Z+1 | Z+2 | X+2 |

Note: X>Y, Z>W, X>Z

| Step | Description | NAN Device A | | | | NAN Device B | | | | NAN Device C | | | |
|---|---|---|---|---|---|---|---|---|---|---|---|---|---|
| | | Native Rank | Advertised Rank | Sequence Number | Inherited From | Native Rank | Advertised Rank | Sequence Number | Inherited From | Native Rank | Advertised Rank | Sequence Number | Inherited From |
| (A)(B)(C) | Initial values | X | X | i | - | Y | Y | j | - | Z | Z | k | - |
| (A)—(B) (C) | B initiates datapath with A | | | | | Y+1 | Y+1 | j+1 | - | | | | |
| (A)—(B) (C) | A responds to B | X+1 | X+1 | i+1 | - | Y+1 | X+1 | j+2 | A | | | | |
| (A)—(B)—(C) | C initiates datapath with B | | | | | Y+2 | X+1 | j+3 | A | Z+1 | Z+1 | k+1 | - |
| (A)—(B)—(C) | B responds to C | X+2 | X+2 | i+2 | - | Y+2 | X+2 | j+3 | A | Z+1 | X+1 | k+2 | B |
| (A)—(B)—(C) (A)—(C) | A initiates datapath with C | X+1 | X+1 | i+3 | - | Y+1 | Y+1 | j+4 | - | Z+2 | X+2 | k+3 | A |
| (A)—(B)—(C) (A)—(C) | C responds to A | | | | | Y+1 | X+1 | j+5 | C | Z+2 | X+1 | k+4 | A |
| (A) (B)—(C) | B terminates datapath with A | X | X | i+4 | - | | | | | Z+1 | Z+1 | k+5 | - |
| (A) (B)—(C) | B inherits the rank from C | | | | | Y+1 | Y+1 | j+6 | - | Z+1 | Y+1 | k+6 | B |
| (A) (B)—(C) | A terminates datapath with C | | | | | | | | | | | | |
| (A) (B)—(C) | C inherits rank from B | | | | | | | | | | | | |
| (A) (B) (C) | C terminates datapath with B | | | | | Y | Y | j+7 | - | Z | Z | k+7 | - |

FIG. 5

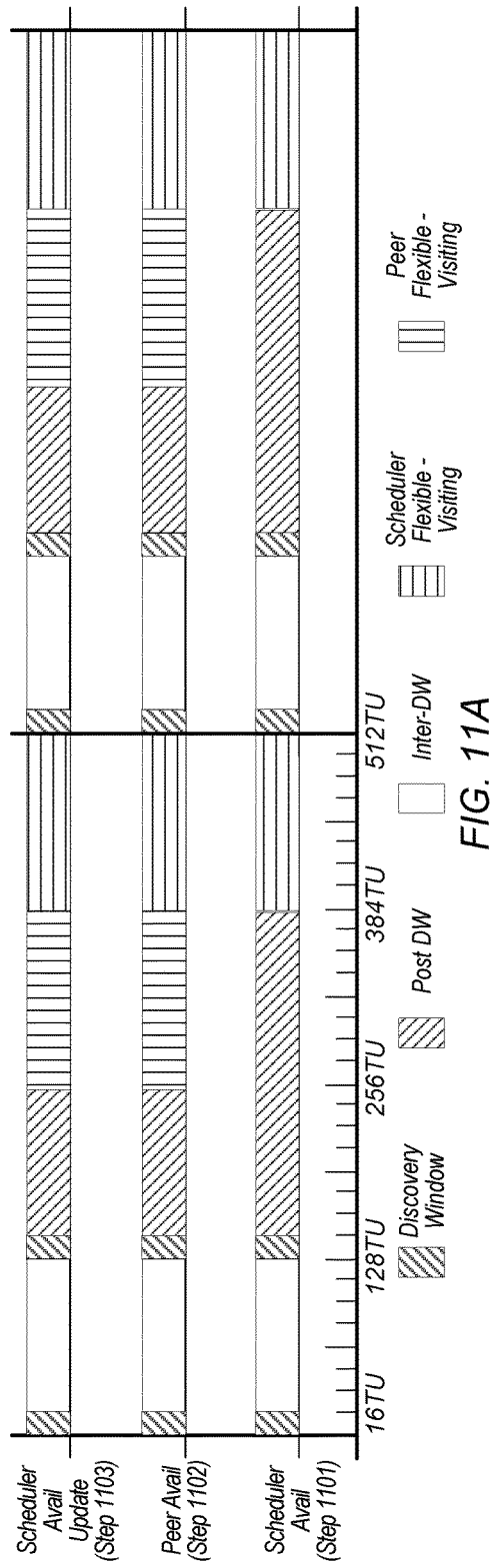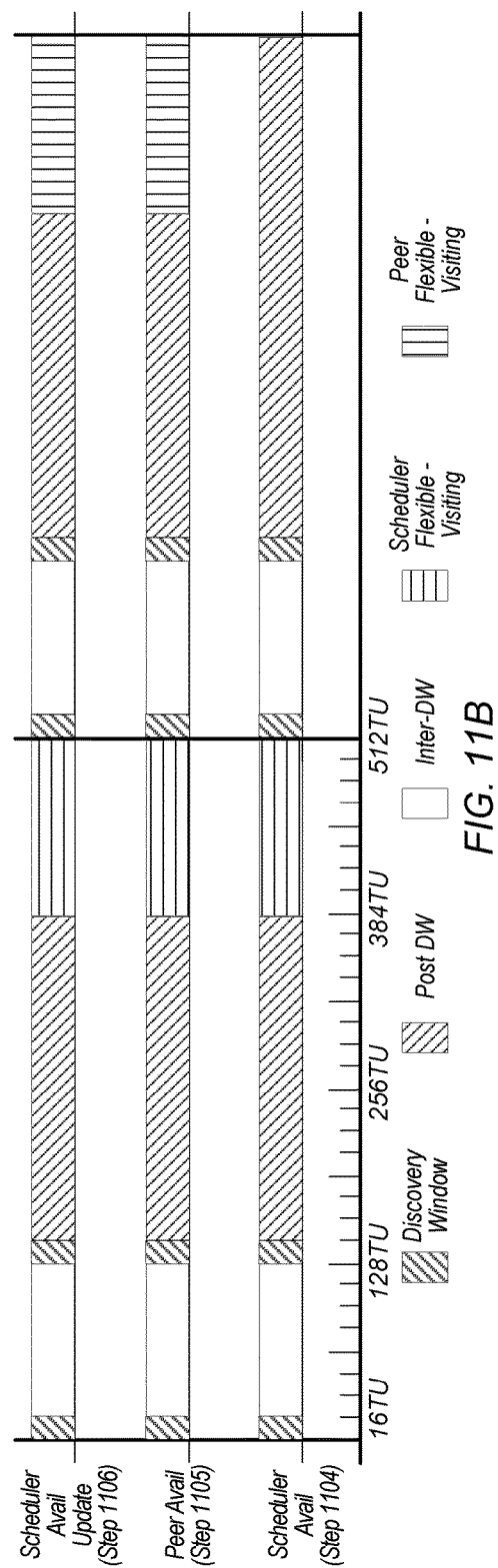

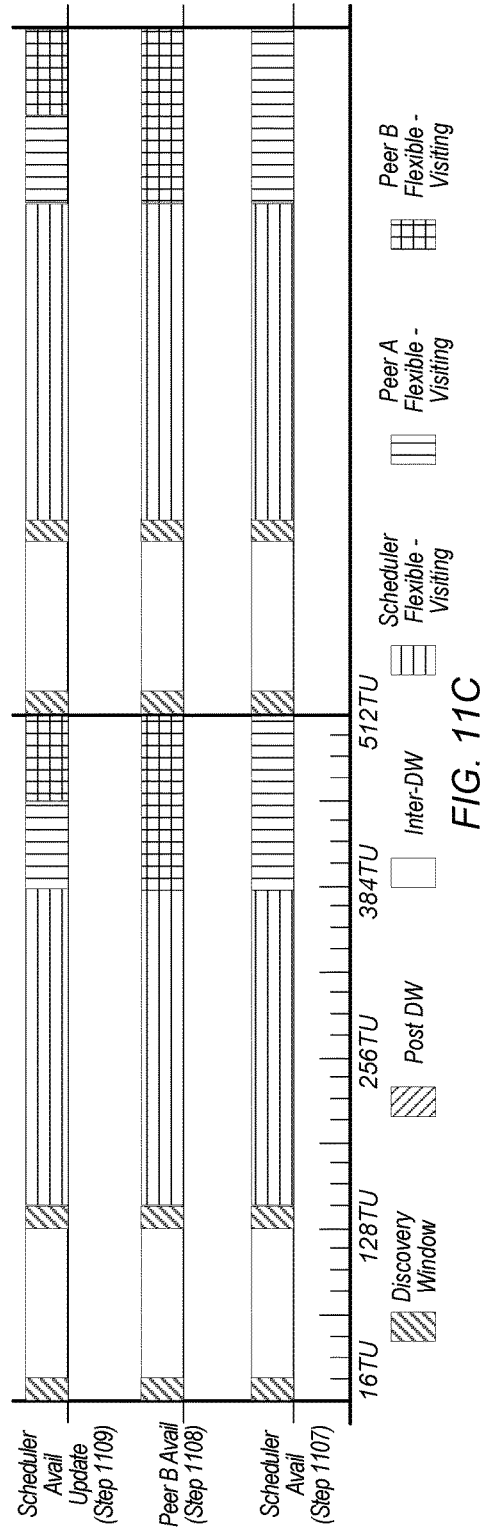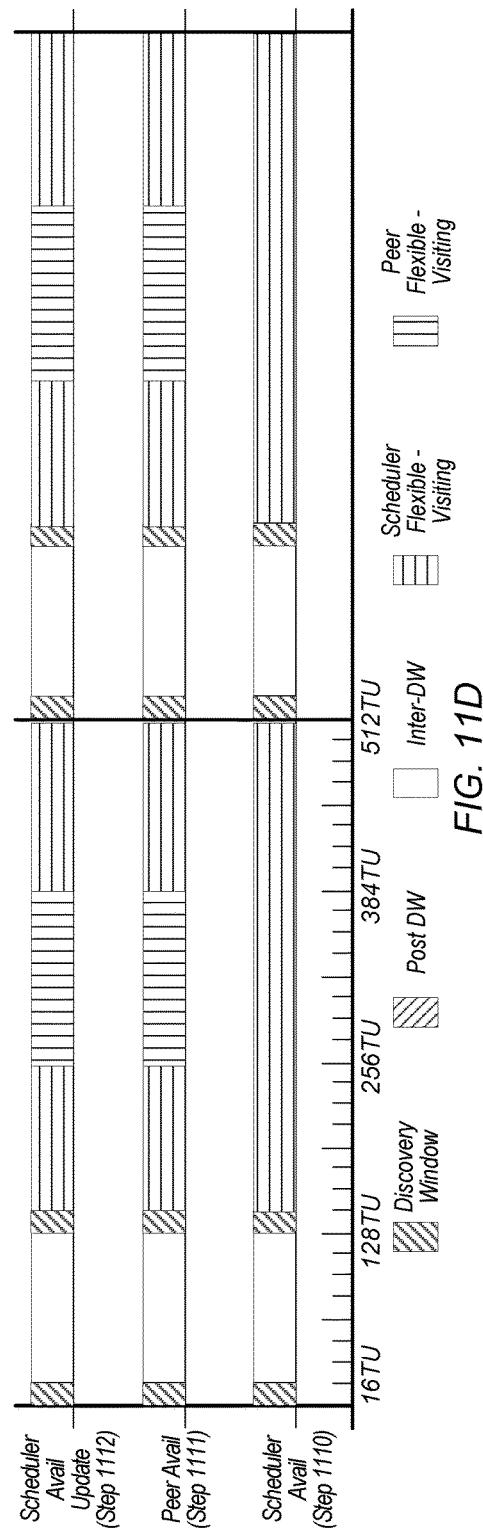

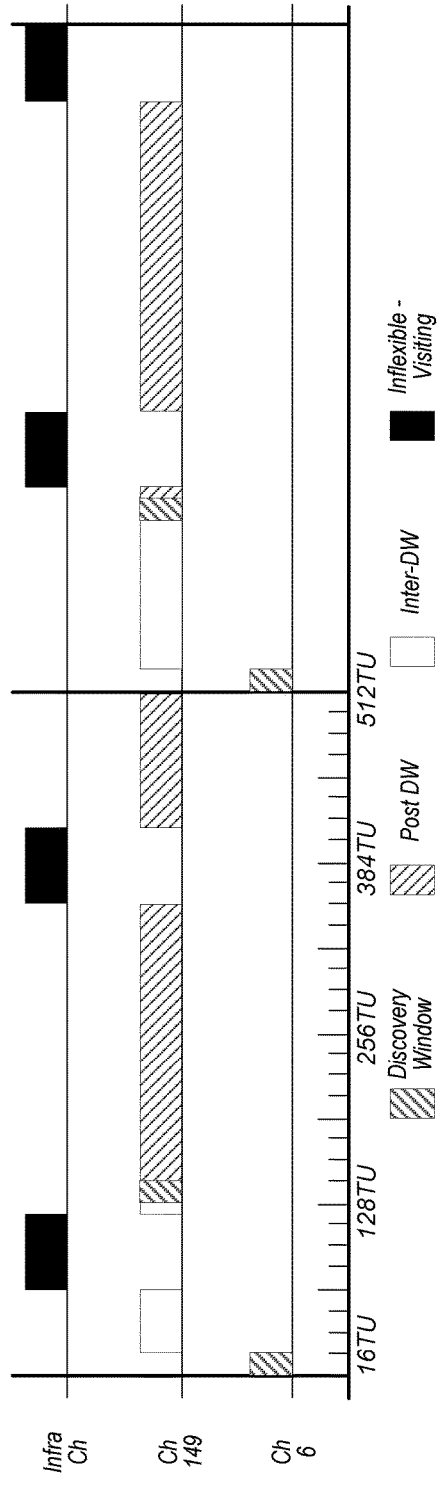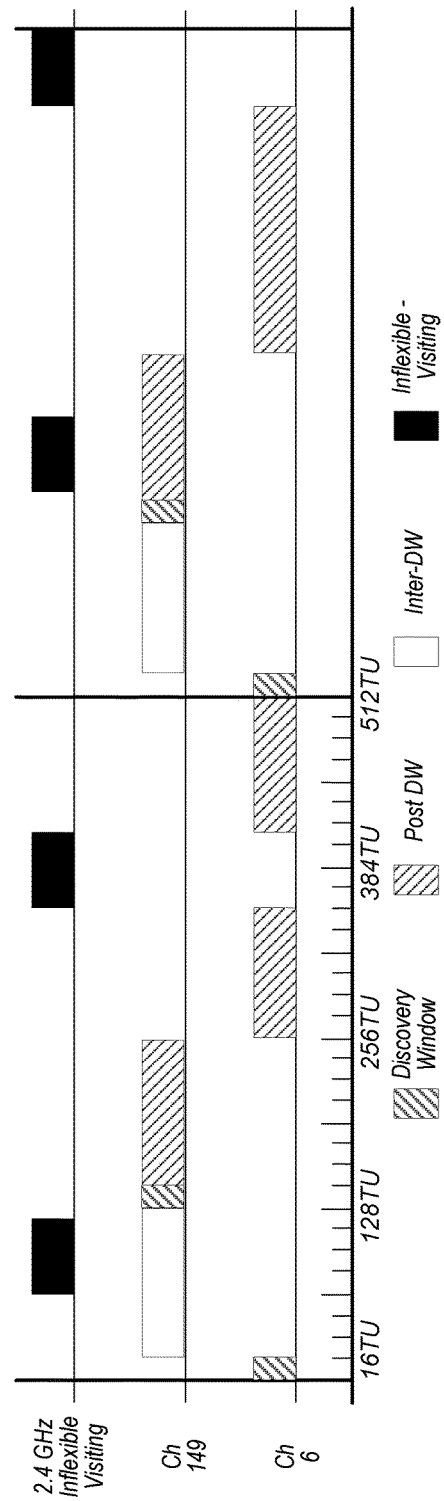

| | Operating Class / Channel Number | Availability Interval Duration | Availability Intervals Bitmap | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| Further Availability Map Attribute | Channel 6 | 16 TUs | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | Channel 149 | 16 TUs | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| | Channel x | 16 TUs | 0 | 0 | 0 | 0 | 0 | 0 | 0 | 0 | 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 |
| | Channel y | 16 TUs | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 0 | 0 | 0 | 0 |
| WLAN Infrastructure Attribute | - | 32 TUs | 0 | 0 | 0 | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 | 0 | 1 | 1 | 0 | 0 |
| P2P Operation Attribute | - | 32 TUs | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 0 | 0 | 0 |
| Further NAN Service Discovery Attribute | - | 64 TUs | 1 | 0 | 0 | 0 | 0 | 0 | 0 | 0 | 1 | 0 | 0 | 0 | 0 | 0 | 0 | 0 | 1 | 0 | 0 | 0 | 0 | 0 | 0 | 0 | 1 | 0 | 0 | 0 | 0 | 0 | 0 | 0 |

FIG. 17

| | Unsolicited Publish and Passive Subscribe | | | | | |
|---|---|---|---|---|---|---|
| | Publish SDF | FSReq SDF | FSReq SDF | CSR SDF | CSC SDF | FAU SDF | FAU SDF |
| Source | Publisher | Subscriber | Publisher | Subscriber (Non-Scheduler) | Publisher (Scheduler) | Subscriber | Publisher |
| Destination | Multicast | Publisher | Subscriber | Publisher | Subscriber | Publisher | Subscriber |
| Schedule Attributes | 1. Scheduler Rank<br>2. Base channel preference and limitations<br>3. FAA/IAA with individual schedules<br>4. FAA with existing base schedule | FAA for pre-datapath operation (PDO) | FAA for pre-datapath operation (PDO) | 1. Scheduler Rank<br>2. Base channel preference and limitations<br>3. FAA for pre-datapath operation<br>4. FAA/IAA with individual schedules<br>4. FAA with existing base schedule | 1. Initial FAA for datapath<br>2. Base Schedule for datapath | Updated FAA for datapath | Updated FAA for datapath |

FIG. 18A

| | Unsolicited Publish and Passive Subscribe | | | | |
|---|---|---|---|---|---|
| | Publish SDF | FSReq SDF | FSReq SDF | CSR SDF | CSC SDF | FAU SDF |
| Source | Publisher | Subscriber | Publisher | Subscriber (Scheduler) | Publisher (Non-Scheduler) | Subscriber |
| Destination | Multicast | Publisher | Subscriber | Publisher | Subscriber | Publisher |
| Schedule Attributes | 1. Scheduler Rank<br>2. Base channel preference and limitations<br>3. FAA/IAA with individual schedules<br>4. FAA with existing base schedule | FAA for pre-datapath operation (PDO) | FAA for pre-datapath operation (PDO) | 1. Scheduler Rank<br>2. Initial FAA for datapath<br>3. Base Schedule for datapath | Updated FAA for datapath | Updated FAA for datapath |

FIG. 18B

| | Active Subscription and Solicited Publish | | | | | | |
|---|---|---|---|---|---|---|---|
| | Subscribe SDF | Publish SDF | FSReq SDF | FSRsp SDF | CSR SDF | CSC SDF | FAU SDF |
| Source | Subscriber | Publisher | Subscriber | Publisher | Subscriber (Scheduler) | Publisher (Non-Scheduler) | Subscriber |
| Destination | Multicast | Subscriber | Publisher | Subscriber | Publisher | Subscriber | Publisher |
| Schedule Attributes | 1. Scheduler Rank<br>2. Base channel preference and limitations<br>3. FAA/IAA with individual schedules<br>4. FAA with existing base schedule | 1. Scheduler Rank<br>2. Base channel preference and limitations<br>3. FAA/IAA with individual schedules<br>4. FAA with existing base schedule | FAA for pre-datapath operation (PDO) | FAA for pre-datapath operation (PDO) | 1. Initial FAA for datapath<br>2. Base Schedule for datapath | Updated FAA for datapath | Updated FAA for datapath |

FIG. 18C

| | Active Subscription and Solicited Publish | | | | | | |
|---|---|---|---|---|---|---|---|
| | Subscribe SDF | Publish SDF | FSReq SDF | FSRsp SDF | CSR SDF | CSC SDF | FAU SDF | FAU SDF |
| Source | Subscriber | Publisher | Subscriber | Publisher | Subscriber (Non-Scheduler) | Publisher (Scheduler) | Subscriber | Publisher |
| Destination | Multicast | Subscriber | Publisher | Subscriber | Publisher | Subscriber | Publisher | Subscriber |
| Schedule Attributes | 1. Scheduler Rank 2. Base channel preference and limitations 3. FAA/IAA with individual schedules 4. FAA with existing base schedule | 1. Scheduler Rank 2. Base channel preference and limitations 3. FAA/IAA with individual schedules 4. FAA with existing base schedule | FAA for pre-datapath operation (PDO) | FAA for pre-datapath operation (PDO) | FAA for pre-datapath operation (PDO) | 1. Initial FAA for datapath 2. Base Schedule for datapath | Updated FAA for datapath | Updated FAA for datapath |

*FIG. 18D*

NEIGHBOR AWARENESS NETWORKING DATAPATH—BASE SCHEDULING, SCHEDULER RANK, AND FURTHER SERVICE DISCOVERY

PRIORITY DATA

This application claims benefit of priority to U.S. Provisional Application Ser. No. 62/136,276, titled "Neighbor Awareness Networking Datapath", filed Mar. 20, 2015 by, Yong Liu, Christiaan A. Hartman, Daniel R. Borges, Peter Heerboth, Lawrie Kurian, Su Khiong Yong, Anand Rajagopalan, Saravanan Balasubramaniyan, Tashbeeb Hague, Andreas Wolf, Guoqing Li, Lilach Zukerman, and Oren Shani, and to U.S. Provisional Application Ser. No. 62/150,187, titled "Neighbor Awareness Networking Datapath", filed Apr. 20, 2015, by, Yong Liu, Christiaan A. Hartman, Daniel R. Borges, Peter Heerboth, Lawrie Kurian, Su Khiong Yong, Anand Rajagopalan, Saravanan Balasubramaniyan, Tashbeeb Hague, Andreas Wolf, Guoqing Li, Lilach Zukerman, and Oren Shani, both of which are hereby incorporated by reference in their entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "wireless stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Embodiments described herein relate to a system and methods for publishing of and subscription to services on behalf of a peer wireless device.

Embodiments relate to a wireless station (or device) that includes one or more antennas, one or more radios, and one or more processors coupled to (or in communications with) the radios. At least one radio is configured to perform Wi-Fi communications. The wireless station may perform voice and/or data communications, as well as the methods described herein.

In some embodiments, one or more wireless stations operate to configure Neighbor Awareness Networking (NAN)—direct communication between neighboring wireless stations, e.g., without utilizing an intermediate access point. Embodiments of the disclosure relate to NAN datapath configuration. The NAN datapath embodiments described herein provide a mechanism through which devices can communicate and provide services. Aspects of the datapath development include datapath scheduling, including datapath setup and scheduling attributes, scheduler rank management, and further NAN discovery. The datapath model may be implemented for unicast and multicast communication between wireless stations.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 5 illustrates an example scenario of scheduler rank transition, according to some embodiments.

FIGS. 11A-11D illustrate example methods for adjustment of a base schedule to incorporate a flexible visiting schedule, according to some embodiments.

FIG. 12A-12B illustrate example base schedules incorporating a device's inflexible visiting schedule, according to some embodiments.

FIG. 17 illustrates an example of a bitmap showing available time slots for NAN data interface, according to some embodiments.

FIGS. 18A-18D illustrate parameter (or attributes or schedule attributes) lists that may be included in each service discovery frame type, according to some embodiments.

Figure 1:
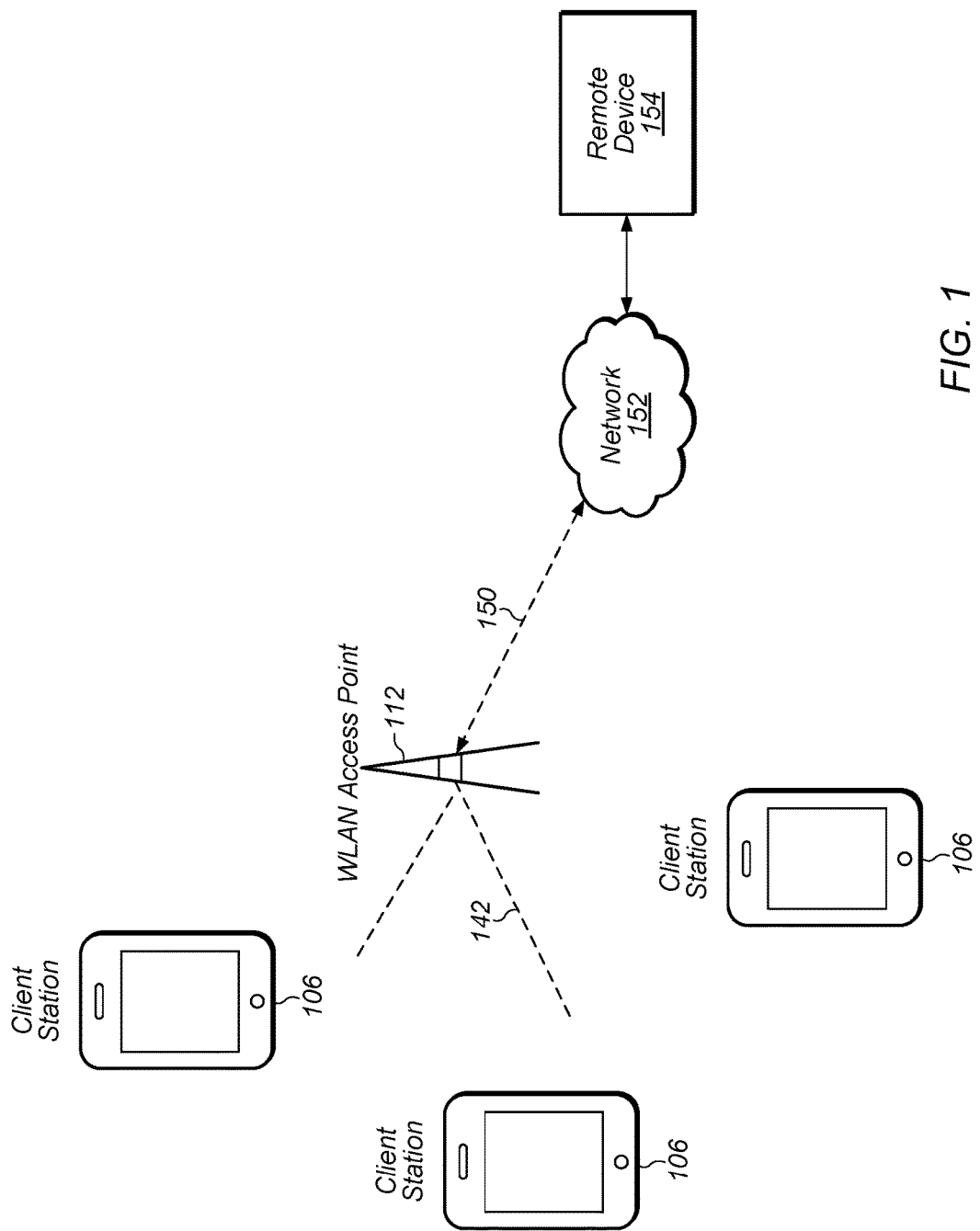
FIG. 1 illustrates an example WLAN system according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
 UE: User Equipment
 AP: Access Point
 DL: Downlink (from BS to UE)
 UL: Uplink (from UE to BS)
 TX: Transmission/Transmit
 RX: Reception/Receive
 LAN: Local Area Network
 WLAN: Wireless LAN
 RAT: Radio Access Technology
 DW: Discovery Window
 NW: Negotiation Window
 FAW: Further Availability Window
 SID: Service ID
 SInf: Service Information
 Sinf-Seg: Service Information Segment
 NW-Req: to request the peer NAN device to present in NW
 CaOp: Capabilities and Operations elements
 Security: Security preferences
 SessionInfo: advertisement_id, session_mac, session_id, port, proto
 ChList: preferred datapath channels Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked (e.g., in communication) via one or more NAN data links. Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired or wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one mobile device 106 is configured to communicate directly with one or more neighboring mobile devices, without use of the access point 112.

Figure 2:
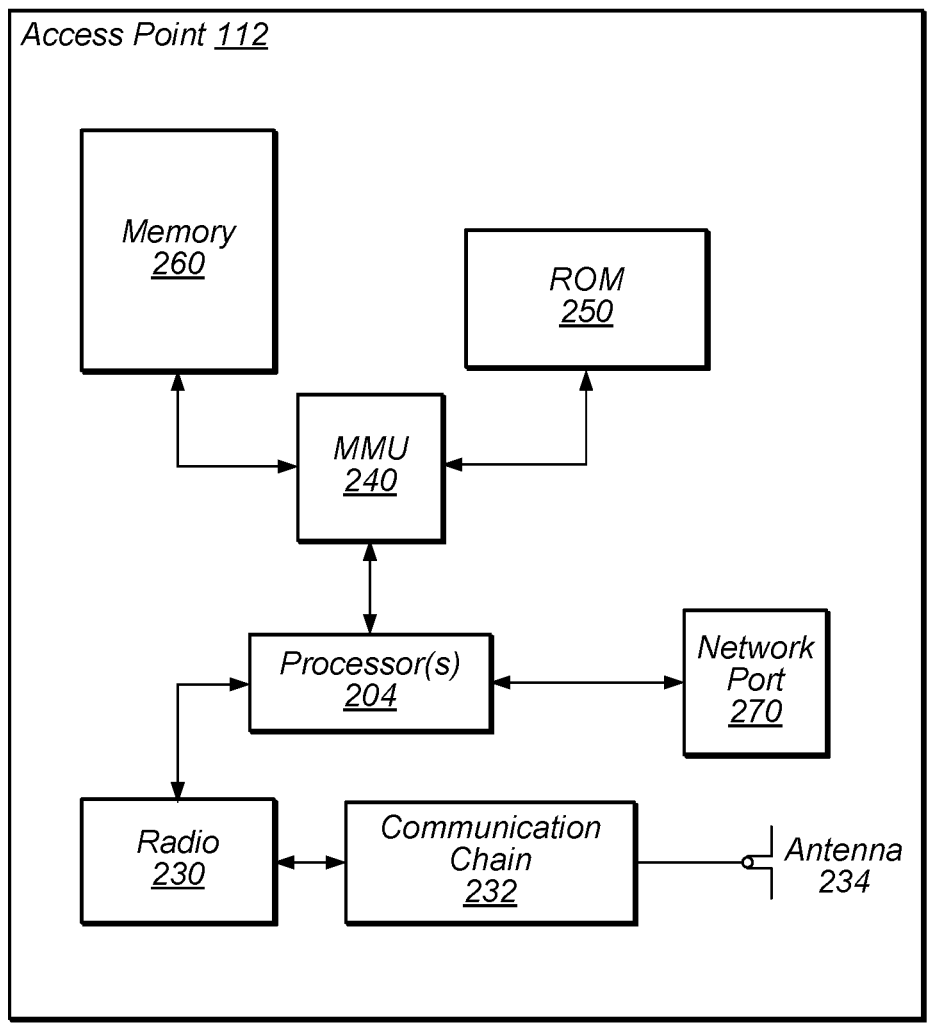
FIG. 2 illustrates a block diagram of an example WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is merely one example of a possible system. As shown, the AP 112 may include processor(s) 204 which may execute program instructions for the AP 112. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example port 270 may be an Ethernet port. The local network may provide connectivity to additional networks, such as the Internet.

The AP 112 may include at least one antenna 234. The at least one antenna 234 may be configured to operate as a wireless transceiver and may be further configured to communicate with mobile device 106 via wireless communication circuitry 230. The antenna 234 communicates with the wireless communication circuitry 230 via communication chain 232. Communication chain 232 may comprise one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Figure 3:
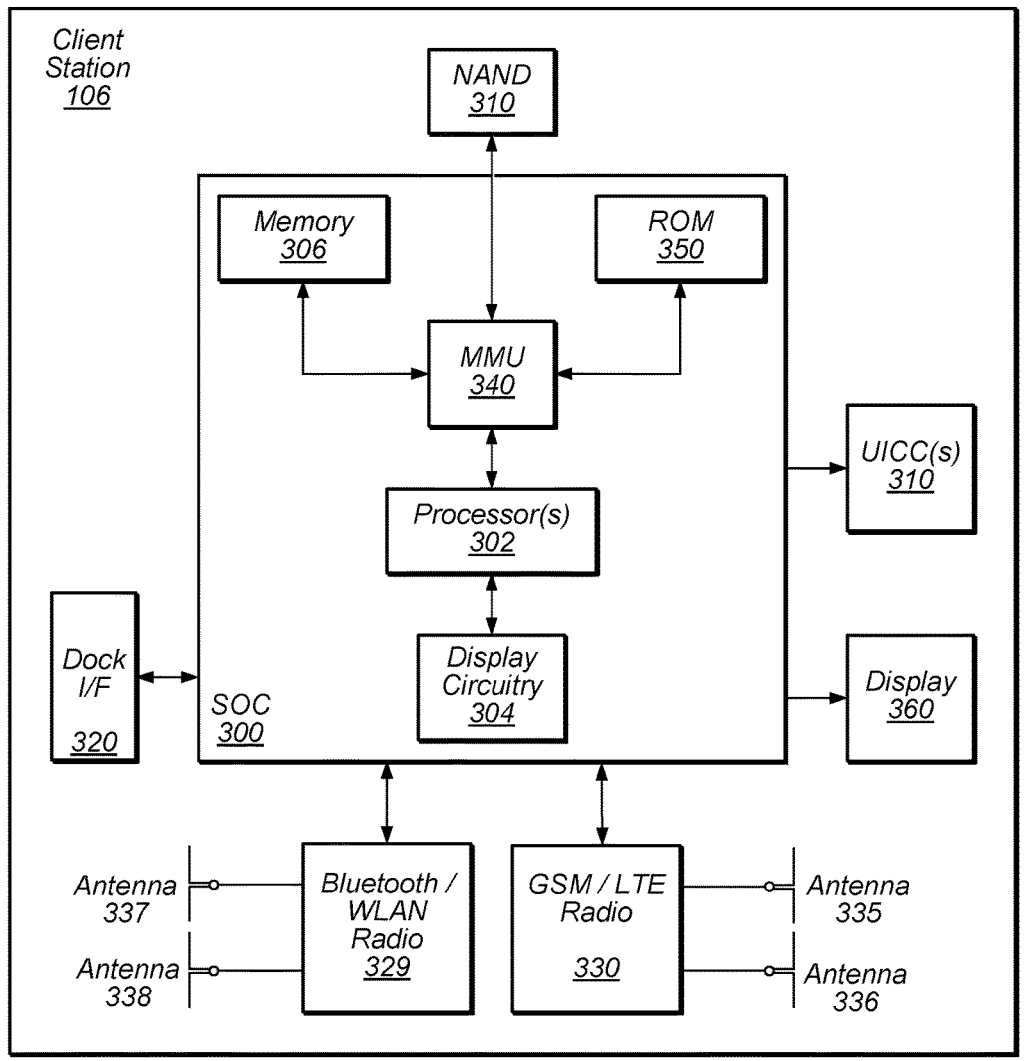
FIG. 3 illustrates an example simplified block diagram of a client station (UE), according to some embodiments.

FIG. 3—Client Station Block Diagram

FIG. 3 illustrates an example simplified block diagram of a client station 106. According to embodiments, client station 106 may be a user equipment device (UE), a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further comprise one or more smart cards 310 that comprise SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may comprise multiple receive chains and/or multiple transmit chains for receiving and/or transmitting multiple spatial streams, such as in a multiple-input multiple output (MIMO) configuration.

As shown, the SOC 300 may include processor(s) 302 which may execute program instructions for the client station 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may be comprised of one or more processing elements. In other words, one or more processing elements may be included in processor 302. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry

329 may each be comprised of one or more processing elements. In other words, one or more processing elements may be included in cellular communication circuitry 330 and short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station with which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability.

The NAN protocol includes two aspects: 1) synchronization and discovery (NAN 1.0) and 2) datapath transmission (NAN 2.0). NAN 1.0 describes methods for NAN protocol synchronization and discovery. As disclosed in U.S. patent application Ser. No. 14/960,488 and U.S. patent application Ser. No. 15/051,640, after two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods for datapath setup and scheduling, including further service discovery and scheduler rank management.

NAN Scheduler Rank

In some embodiments, when two NAN devices meet and decide to establish a datapath (e.g., a unicast datapath), the devices efficiently agree on a based schedule for the datapath via minimal negotiation overhead. Both devices may announce schedule preferences and limitations and one of the NAN devices may be elected as the scheduler for the datapath (datapath scheduler). The datapath scheduler may determine the base schedule for the datapath based on the announced preferences and limitations. Note that each device may add individual schedules on top of the base schedule to create combined schedules for a device and may announce the combined schedules as the device's availability schedule. In some embodiments, an individual schedule may be added to a base schedule when a particular device cannot follow the base schedule for certain time periods. For example, a device may not be able to follow the base schedule for certain time periods if the device has a concurrent data link that may require the device to switch to a different channel. As another example, a device may not be able to follow the base schedule for certain time periods if the device needs to switch off its Wi-Fi radio for multi-radio co-existence purposes.

In some embodiments, when a device announces availability schedules, which may include its individual schedule(s), peer devices may make use of the device's individual schedule(s) by switching together with the device to maintain continuous communications. Note that there may be at least two types of individual schedule(s). A flexible individual schedule is an individual schedule that may be adjusted to align with discovery window (DW) intervals, further availability time slots, a base schedule, a peer device's availability schedules, and so forth. An inflexible individual schedule is an individual schedule that may not be adjusted.

In some embodiments, each NAN device may maintain a scheduler rank and include the scheduler rank value in some or all of its service discovery frames. The scheduler rank may include a schedule priority field and a tie break field. The value of the schedule priority field may be increased whenever the NAN device adds an active datapath and may be increased more if an added datapath requires high quality of service (QoS) support (e.g., a video or audio service). Additionally, the value of the schedule priority field may be decreased whenever an active datapath is closed. In some embodiments, the value of the tie break field may be a combination of a random number and the NAN device's MAC address. Thus, when the NAN device receives the scheduler rank from a peer device (e.g., a datapath candidate), it may determine its scheduling role for the datapath by comparing its own scheduler rank with the peer device's scheduler rank. If the NAN device has a higher scheduler rank than the peer device, then the NAN device may be the scheduler. If the NAN device has a lower scheduler rank than the peer device, then the peer device may be the scheduler. The device that is not the scheduler (e.g., the non-scheduler) establishes a base schedule with a scheduler for a datapath and may inherit the scheduler's scheduler rank as its own scheduler rank.

As noted above, NAN devices may announce base channel/schedule preferences and/or limitations in service discovery frames. Channel preferences may include an indication of no channel preference (any channel), a list of candidate channels, a list of preferred clean channels, a list of channels for existing/active NAN datapaths, and/or a list of channels for concurrent data paths. Limitations may include, e.g., an indication to only use a 2.4 GHz channel and/or a list of channels to avoid, among other limitations.

In some embodiments, once NAN devices receive each other's scheduler ranks, base channel preferences and limitations, and schedule preferences and limitations, the scheduler (i.e., NAN device with higher scheduler rank) may determine the base schedule according to the preferences and limitations of the NAN devices. For example, if NAN devices share a common set of preferred channels, the scheduler may choose one or more base channels from this common set. Additionally, if the NAN devices have one or more conflicting preferences, the scheduler may use one or more default channels (such as the NAN channels) as the base channels. Alternatively, the scheduler may use its own preferred channels. Note that if one of the NAN devices prefers one or more default channels (e.g., such as the NAN channels), the scheduler may favor selection of one of the default channels when determining the base channels for the datapath. Also, for example, if the peer device (non-scheduler) can only operate in a 2.4 GHz band, the scheduler may include a 2.4 GHz base channel in its base schedule.

Figures 4A, 4B:
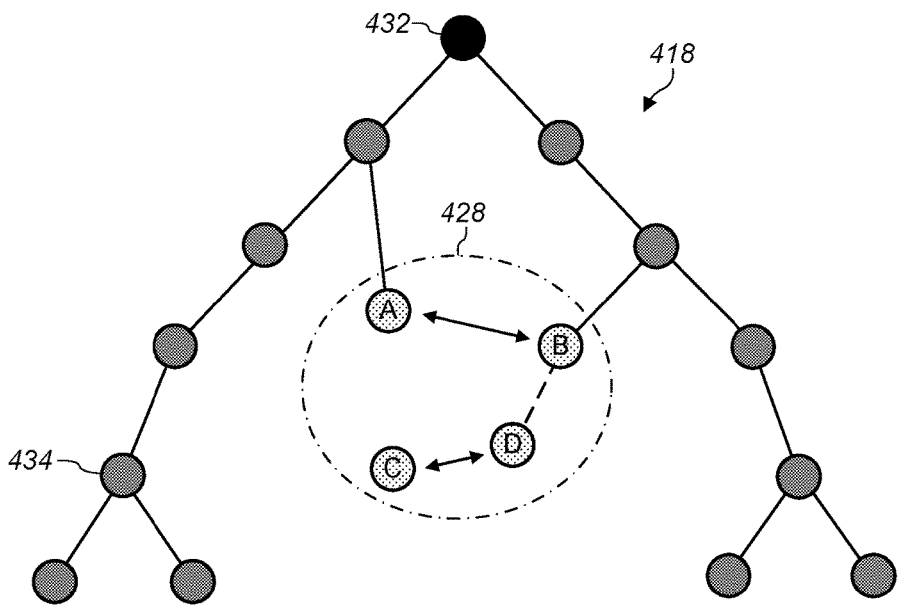
FIG. 4A illustrates an example of a method for establishing datapath schedules among peer devices based on scheduler rank, according to some embodiments.
FIG. 4B illustrates an example progression of scheduler rank for NAN devices A-D as the various datapaths described in reference to FIG. 4A are established, according to some embodiments.

FIG. 4A illustrates an example of a method for establishing datapath schedules among peer devices based on scheduler rank, according to some embodiments. FIG. 4B illustrates an example progression of scheduler rank for NAN devices A-D as the various datapaths described in reference to FIG. 4A are established, according to some embodiments.

The method exemplified by FIG. 4A may be used in conjunction with any of the systems or devices shown in the above Figures, among other devices. In various embodiments, some of the method elements may be performed concurrently, in a different order than described, or may be omitted. Additional method elements may also be performed as desired.

As shown, a first NAN device (e.g., NAN device A) may establish a first datapath with a second NAN device (e.g., NAN device B). The NAN devices may be located within a NAN cluster, such as NAN cluster 418. In other words, the NAN devices may be associated with (e.g., in communication with) multiple peer wireless stations linked (e.g., in communication) via one or more NAN data links. Note that a peer wireless station may be a member of more than one NAN cluster. In addition, NAN device 432 may be an anchor master for NAN cluster 418 and NAN cluster 418 may also include peer NAN devices 434. Further, the NAN devices may be located within NAN data cluster 428. In other words, the NAN devices may be within a set of peer wireless stations in a common (e.g., same) NAN cluster (e.g., NAN cluster 418) that share a common base schedule (e.g., a NAN data cluster base schedule). In addition, peer wireless stations in a NAN data cluster may share at least one NAN data link with another member wireless station within the NAN data cluster.

The first NAN device (e.g., NAN device A) may have a higher scheduler rank than the second NAN device (e.g., NAN device B). For example, as illustrated in FIG. 4B, NAN device A may have a scheduler rank of X and NAN device B may have a scheduler rank of Y, where X is greater than Y. Thus, NAN device A may establish (or determine) a first base schedule for a first datapath between the NAN devices (e.g., datapath A-B). After the first datapath has been established, NAN device B may inherit the scheduler rank of NAN device A (e.g., both NAN devices may now have a scheduler rank of X+1). Additionally, a third NAN device may establish a second datapath with a fourth NAN device (e.g., NAN device C and D establishing datapath C-D). NAN device C may have a higher scheduler rank than NAN device D and may establish a second base schedule for the second datapath. For example, as illustrated in FIG. 4B, NAN device C may have a scheduler rank of Z and NAN device D may have a scheduler rank of W, where Z is greater than W. After the second datapath has been established, NAN device D may inherit the scheduler rank of NAN device C (e.g., both NAN devices may now have a scheduler rank of Z+1).

Further NAN device B may establish a third datapath with NAN device D (e.g., NAN device B establishing datapath B-D). Note that prior to establishing the third datapath, the scheduler rank for NAN devices A and B were equal and similarly, the scheduler rank for the NAN devices C and D were equal. Note additionally that NAN device B may have a higher scheduler rank than NAN device D (e.g., X may be greater than Z) and, after establishment of the third datapath, the scheduler rank of the NAN devices B and D may each increase since NAN devices B and D are adding an additional datapath (i.e., the third datapath), and, after the third datapath has been established, NAN device D may inherit the scheduler rank of NAN device B (e.g., both NAN devices may now have a scheduler rank of X+2). The scheduler rank of NAN devices B and D may be greater than the scheduler ranks of NAN devices A and C.

NAN device B may evaluate the preferences and limitations of NAN device D and may decide a base schedule for the third datapath (e.g. datapath B-D) accordingly. NAN device B may reuse the base schedule of the first datapath for the third datapath to minimize effects on the first datapath, or it may modify the base schedule of the first datapath to accommodate the NAN device D's preferences and limitations. Additionally, since NAN device A now has a lower scheduler rank than NAN device B, NAN device A may update its base schedule based on NAN device B. Similarly, NAN device D may update its base schedule based on NAN device B and NAN device C may update its base schedule based on NAN device D since it now has a lower scheduler rank than NAN device D. Finally, NAN devices A and C may inherit (e.g., update) their scheduler rank based on the scheduler ranks of NAN devices B and D, respectively.

Scheduler Rank Management

As noted above, NAN devices may maintain a scheduler rank. Additionally, in some embodiments, each NAN device may maintain several values associated with its scheduler rank for the purpose of determining its scheduling role in establishing connections with other NAN devices. These values may comprise a native rank, an advertised rank, and an advertised rank update indicator. The native rank may represent a baseline scheduling priority value for the NAN device. The native rank may be determined based on the scheduling flexibility and the local scheduling constraints of the NAN device (e.g., due to the resource usage and/or demands of Bluetooth, Wi-Fi Direct, NAN, etc.).

For example, a first NAN device operating multiple communications processes, each requiring time and processing resources, may have a higher native rank than a second NAN device less burdened by such processes. In some scenarios the native rank of the NAN device may serve as the NAN device's advertised rank. For example, if the NAN device has no data path peer NAN devices, it may advertise its native rank, i.e., use its native rank as its advertised rank. Alternatively, the NAN device's advertised rank may be inherited from a peer NAN device. The advertised rank of the NAN device may be used in comparisons to peer NAN devices for the purpose of determining the scheduling role of the NAN device. Thus, the advertised rank, rather than the native rank, may be the value used by peer NAN devices in rank calculations. Each time the advertised rank changes, the advertised rank update indicator may be adjusted to indicate this change. The advertised rank update indicator may be referred to as a sequence number or simply as an update indicator, and may represent some variable, such as a time stamp or counter value, usable for notifying other peer NAN devices of changes in the advertised rank of the NAN device. In some embodiments, the advertised rank update indicator may increment for each change to the NAN device's advertised rank in order to alert peer NAN devices of this change, which may avoid peer NAN devices using obsolete information in rank calculations.

In some embodiments, if a first NAN device establishes a data path connection with a second NAN device, the first NAN device may compare its advertised rank to the advertised rank of the second NAN device. If the advertised rank of the second NAN device is higher than that of the first NAN device, the first NAN device may adopt the advertised rank of the second NAN device and increment its advertised rank update indicator. Although the advertised rank of the first NAN device may have adjusted to the advertised rank of the second NAN device, the native rank of the first NAN device may remain unaffected.

In some embodiments, each NAN device may maintain one or more tables (or data structures) of the advertised ranks and update indicators for peer NAN devices with which it has established data paths. For example, if a first NAN device has inherited its advertised rank from a second NAN device, it may also track this second NAN device. This may allow each NAN device to update its advertised rank according to variations in the rank values of associated NAN devices.

In some embodiments, a NAN device may update its advertised rank in response to any of following conditions:

(1) if a second NAN device from which the NAN device has inherited its advertised rank reduces its advertised rank the NAN device may reduce its advertised rank as well to match the second NAN device;

(2) if a data path peer NAN device increases its advertised rank the NAN device may also increase its advertised rank to match the data path peer NAN device; or (3) if its own native rank changes value (e.g., because of changes in its scheduling constraints).

In some embodiments, a system of scheduler rank management may be implemented for a NAN data cluster, i.e., a set of peer wireless stations in a common (e.g., same) NAN cluster that share a common base schedule (e.g., a NAN data cluster base schedule). In addition, peer wireless stations in a NAN data cluster may share at least one NAN data link with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Each NAN device in a NAN data cluster may maintain a native rank value and an advertised rank value. Multiple NAN devices in a NAN data cluster may be presented as having the form of a tree, with the NAN device having the highest native rank being the root of the tree. To avoid "tie" scenarios, wherein multiple NAN devices may share the same native rank, a tie break value (e.g., a MAC address as discussed above) may be associated with the native rank of each NAN device, or may be incorporated into the initial calculation of the native rank to avoid equivalent native rank values in a comparison of two NAN devices.

In some embodiments, after the root NAN device is determined for a NAN data cluster, the native rank of the root NAN device may be propagated to the rest of the NAN devices in the tree such that the advertised rank of every NAN device in the tree (or the NAN data cluster) is made equal to the native rank of the root NAN device, i.e., the highest native rank in the tree. In this manner, the highest native rank for each data cluster may represent the rank of the entire data cluster. In addition, if a child NAN device does not have a direct connection with the root NAN device, it may inherit its advertised rank from a parent NAN device to which it is connected (i.e., a second root NAN device of a sub-tree), which may in turn inherit its advertised rank from another parent NAN device. Such a pattern of propagation may continue until the advertised rank of the root NAN device is propagated throughout the tree (i.e., the NAN data cluster).

In some embodiments, each child NAN device (excluding the root NAN device) may record (e.g., propagate one or more tables or data clusters): (1) the native rank of the root NAN device as its own advertised rank; (2) identification (e.g., the MAC address) associated with the root NAN device; (3) an update indicator (i.e., an advertised rank update indicator or update timestamp) associated with the advertised rank of the child NAN device; and (4) information regarding a parent NAN device from which the advertised rank may be inherited.

In some embodiments, a NAN device may increase its native rank when a new data path or a new constraint to its scheduling is added. The native rank may be increased proportionally to the level of constraint added to the NAN device's schedules. The NAN device may reset its internal record of the root NAN device and use its own native rank as its advertised rank when its native rank becomes higher than its advertised rank or when its data path with its parent NAN device is lost. The NAN device may continue to maintain information associated with past root NAN devices, such as rank values, identification information, and an update indicator or timestamp value in some embodiments. This information may be used to filter out obsolete advertised rank values (i.e., the rank of the old root NAN device), which may be received from other NAN devices. Additionally, after the NAN device resets its root NAN device record, it may update its advertised rank and root NAN device record whenever it receives a higher advertised rank with a new timestamp.

FIG. 5 illustrates an example scenario of scheduler rank transition, according to some embodiments. As shown, three NAN devices, henceforth referred to as device A, device B, and device C, which may be initially unconnected, may establish and remove data paths with each other. Initially, device A may have a native rank of X, device B may have a native rank of Y, and device C may have a native rank of Z, where X>Y>Z. As described above, these native rank values may be calculated according to the scheduling constraints of each device. For example, device A, having the highest native rank of X, may have determined itself to have more limited scheduling flexibility due to various constraints than did the other two devices in calculating their respective ranks. Hence, it may be desirable for device A to have a higher priority in determining schedules for communications with the other NAN devices and the higher calculated native rank of device A may indicate this priority. As all three devices may initially lack data paths and may be unconnected, each device may use its own native rank as its advertised rank, i.e., advertise its native rank. Each device may also maintain an advertised rank update indicator, which may also be referred to as an update indicator or a sequence number. Initially, device A may have a sequence number of i, device B may have a sequence number of j, and device C may have a sequence number of k. Each device may increment its sequence number when its advertised rank (but not necessarily its native rank) changes to indicate this change.

To begin, device B may initiate a datapath with device A. In doing so, device B may increment its native rank from Y to Y+1, and since device B may be currently using its native rank as its advertised rank, its advertised rank may also become Y+1. Device B may also increment its sequence number from j to j+1 in response to having updated its advertised rank. Device A may then respond to device B to establish the datapath and may also increment its native rank (and hence its advertised rank) to X+1 and increment its sequence number to i+1. Next, to determine which device has priority in scheduling as part of connection setup, the two devices may compare their advertised ranks. As device A has the higher advertised rank, device B may adopt device A's advertised rank as its own advertised rank, thereby inheriting device A's rank, and may increment its sequence number accordingly. Thus both device A and device B share the native rank of device A (X+1), as their advertised ranks, while the native rank of device B may remain Y+1.

Next, device C may initiate a datapath with device B, incrementing its native rank (and thereby its advertised rank, which initially may be mirroring its native rank) from Z to Z+1. When device B responds to device C, it may similarly increment its native rank (from Y+1 to Y+2). However, because device B is now inheriting its advertised rank from device A (rather than using its own native rank), its advertised rank remains X+1 (and it may not increment its sequence number as its advertised rank has not changed). This advertised rank may then be compared to the advertised rank of device C (now Z+1). As device B's advertised rank is higher than that of device C, device C may now inherit from device B, adopting the advertised rank of device B and incrementing its sequence number in response to this adjustment. At this point, a data path may exist between device A and device B, and another data path may exist between device B and device C.

Device A may then initiate a connection with device C. Thus, device A may increment its native rank (as part of establishing the connection), its advertised rank (mirroring its native rank), and its sequence number (in response to incrementing its advertised rank). Because device B inherits from device A, device B may recognize that device A has changed its advertised rank and thus may update its own advertised rank accordingly (as well as its sequence number to mark the update). Thus, device B and device A may now share an advertised rank of X+2. Device C may respond to the connection request of device A and update its native rank from Z+1 to Z+2 in establishing the connection. Because the advertised rank of device A (now X+2) is higher than the advertised rank of device C (Y+2, inherited from device B), device C may now inherit from device A, adopting device A's advertised rank of X+2 and incrementing its sequence number accordingly. At this point all three devices may have established data paths with each other and may share the advertised rank of X+2, which is equivalent to the native rank of device A.

Device B may terminate its datapath with device A. Both device A and device B may decrease their native ranks by 1, so that the native rank of device A becomes X+1 and the native rank of device B becomes Y+1. Because device B may have now disconnected from device A and hence may no longer inherit its advertised rank from device A, device B may use its own native rank, Y+1, as its advertised rank, and increment its sequence number to indicate this change. Device A may also adjust its advertised rank to its new native rank, X+1. Because device C may still maintain a data path with device A and inherit from device A, device C may now advertise device A's new rank, i.e., change its advertised rank to the advertised rank of device A, although its own native rank may remain unaffected.

In addition, since device B may still be connected to device C, device B may compare its advertised rank (now Y+1) to the advertised rank of device C (now X+1, inherited from device A). Because device C is advertising the higher value, device B may now inherit from device C, changing its advertised rank to that of device C and incrementing its sequence number. At this point, because each of the three devices may be connected to at least one other device, they still may share the same advertised rank, the native rank of device A, which is X+1. Therefore, device B may inherit its advertised rank from device C, which may inherit its advertised rank from device A, which may use its own native rank as its advertised rank.

Device A may then terminate its datapath with device C, decrementing its native rank and advertised rank to X. Device C may decrement its native rank to Z+1, and because it may no longer inherit its advertised rank from device A, it may revert to using its own native rank as its advertised rank. Both device A and C may increment their sequence numbers in response to changing their advertised ranks. Device C may still maintain a connection with device B. Device C may then adopt the higher advertised rank of device B as its own advertised rank, thereby inheriting from device C. Thus, device A may be unconnected and have equal native and advertised ranks of X. Device B and device C may be connected and share device B's native rank, Y+1, as their advertised ranks.

Lastly, device C may terminate its data path with device B. As a result, both device C and device B may decrement their native ranks. Because no devices may be connected, each device may advertise its own native rank, i.e., use its own native ranks as its advertised rank. Here, device B advertises a rank of Y and device C advertises a rank of Z. Note that all three devices may now hold the same rank values as were held initially, before any connections were made. However, their sequence numbers (i.e., advertised rank update indicators) may have changed (increased) over the course of the example scenario to indicate changes to the advertised ranks.

Base Schedule Format

In some embodiments of a base schedule format, a base schedule design may include considerations for matching to NAN discovery schedules, avoidance of "bad channels" (i.e., channels with lower QoS as compare to other available channels), coexistence of concurrent data links (e.g., previously established datapaths), especially infrastructure data links, minimizing channel switching overhead, use of higher QoS channels, minimizing negotiation overhead, and so forth. Additionally, the base schedule format may allow for interoperability.

Figure 6A:
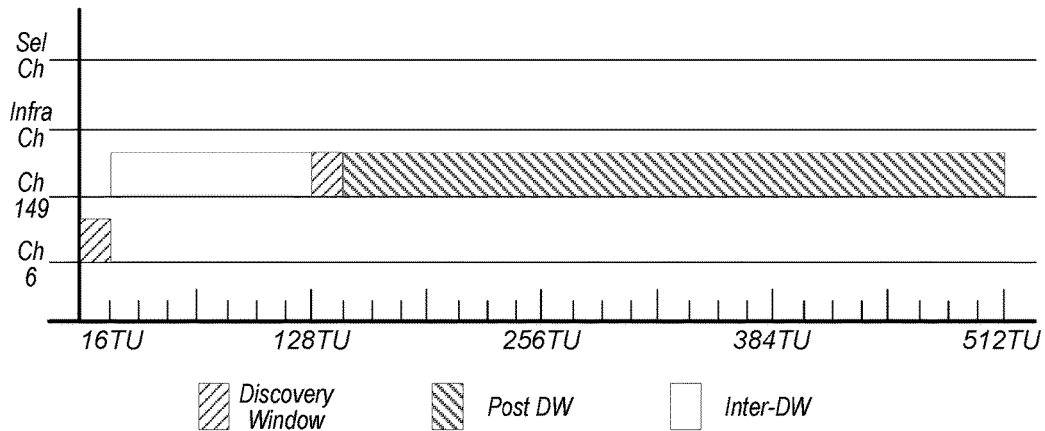
FIGS. 6A-6C illustrate example base schedule formats for a single base channel, according to some embodiments.
Figure 6B:
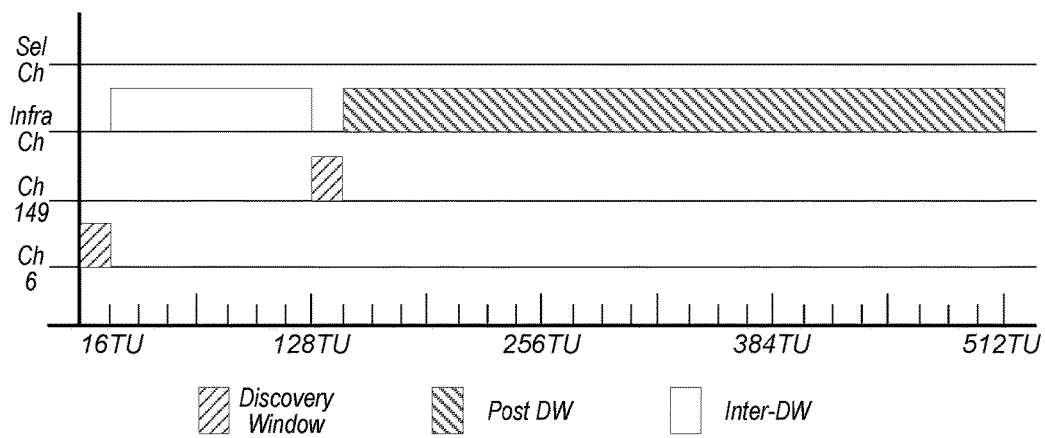
Figure 6C:
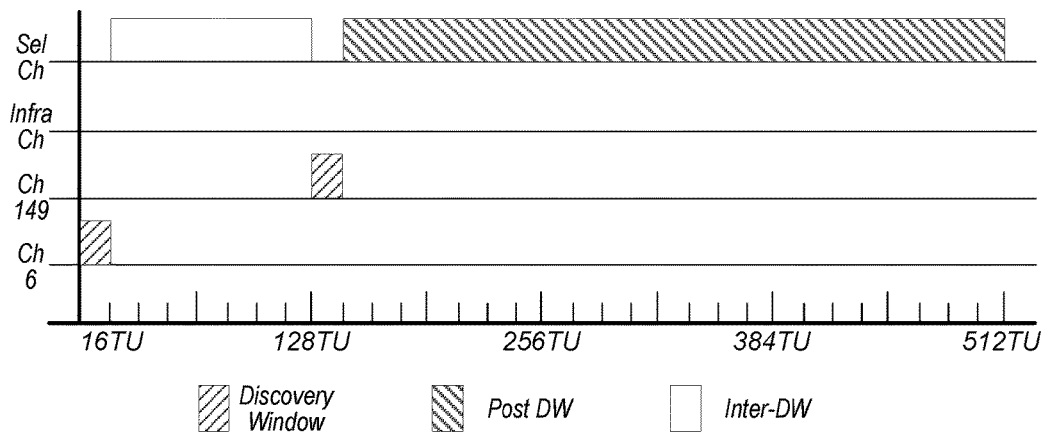
Figure 7A:
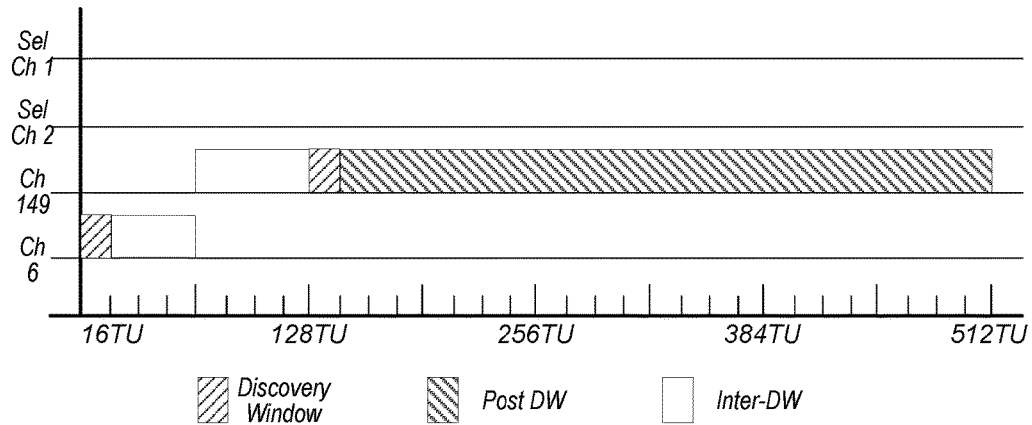
FIGS. 7A-7B illustrate example base schedule formats for multiple base channels, according to some embodiments.
Figure 7B:
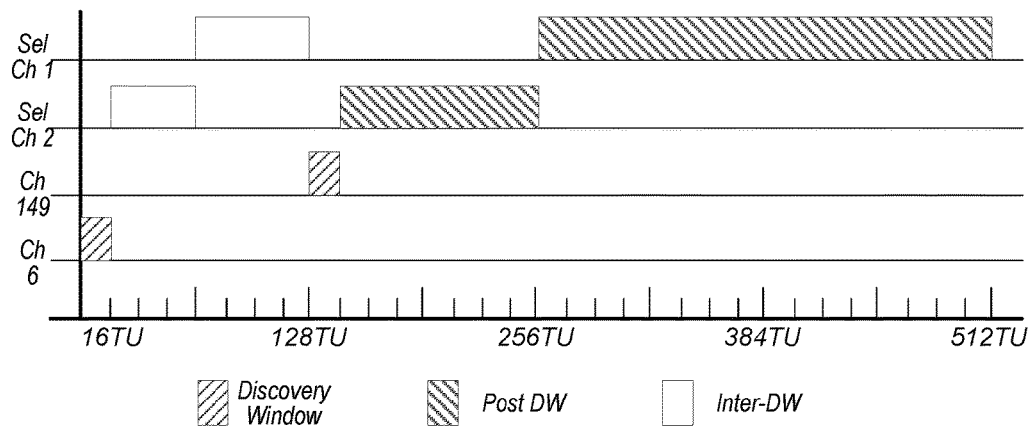
Figure 8A:
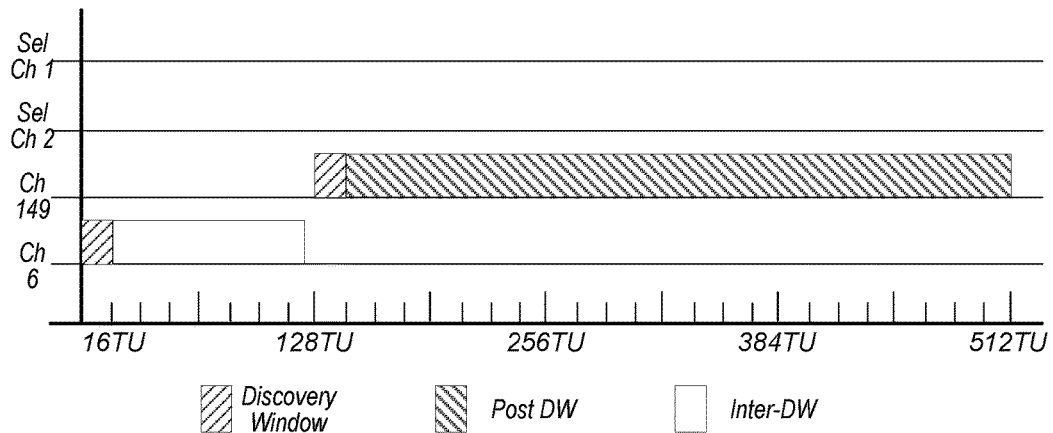
FIGS. 8A-8B illustrate example base schedule formats for multiple base channels, according to some embodiments.
Figure 8B:
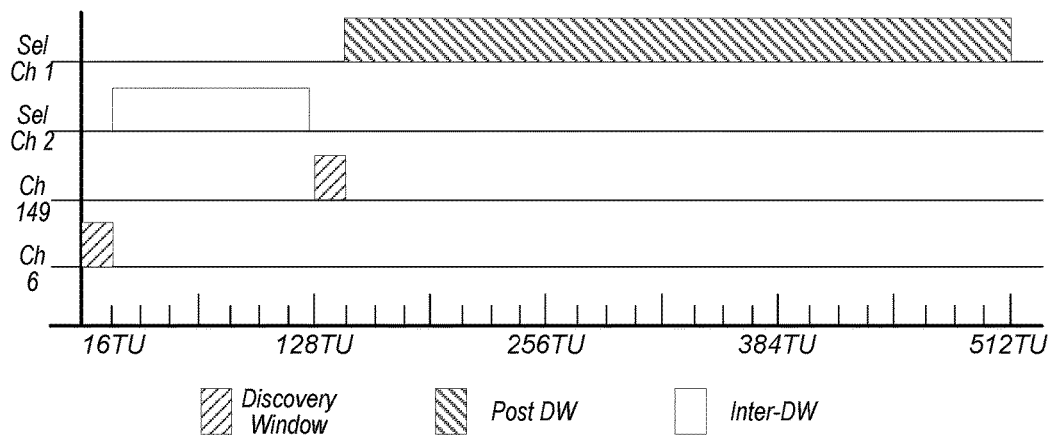
Figure 9A:
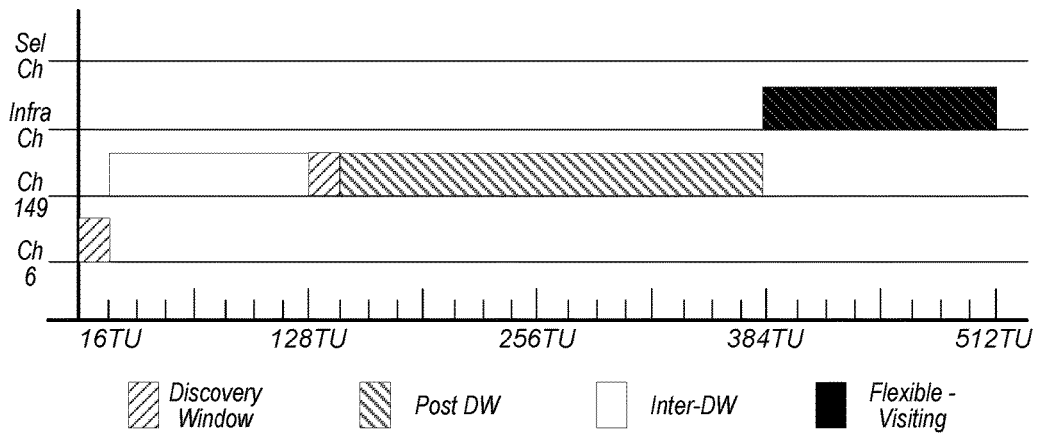
FIGS. 9A-9B illustrate example base schedule formats incorporating a device's periodic visiting individual schedule, according to some embodiments.
Figure 9B:
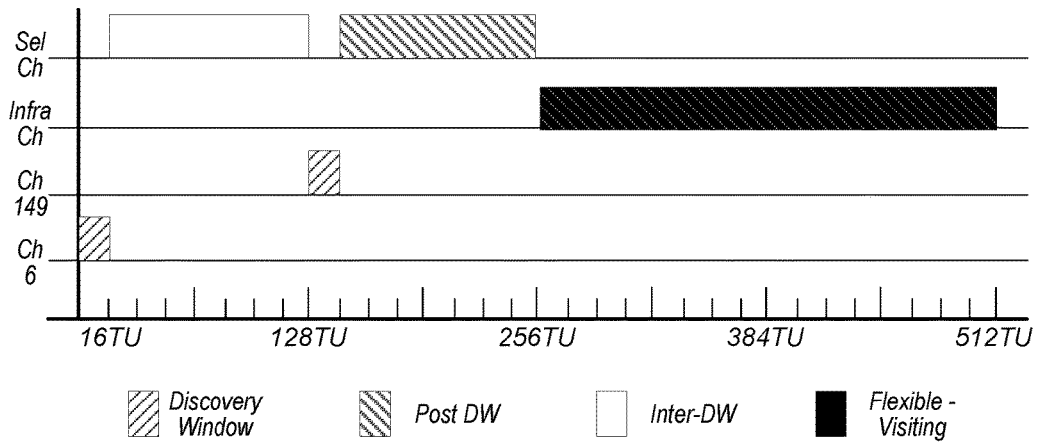
Figure 10:
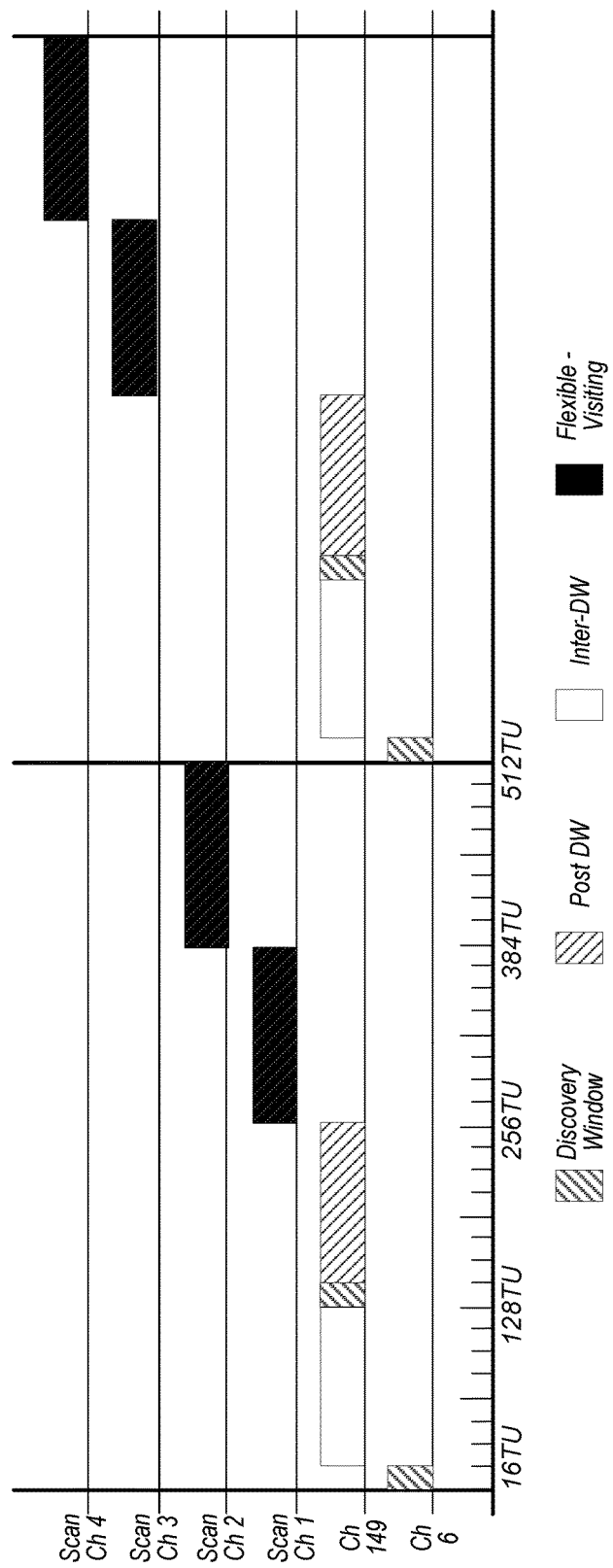
FIG. 10 illustrates an example base schedule incorporating a device's non-periodic visiting schedule, according to some embodiments.

FIGS. 6A-6C, 7A-7B, 8A-8B, 9A-9B, and 10 illustrate various example base schedule formats, according to some embodiments. FIGS. 6A-6C illustrate various base schedule formats for a single base channel. FIGS. 7A-7B and 8A-8B illustrate various base schedule formats for multiple base channels. FIGS. 9A-9B illustrate various base schedule formats incorporating a device's periodic visiting individual schedule. FIG. 10 illustrates a base schedule incorporating a device's non-periodic visiting schedule.

FIG. 6A illustrates an example use of the 5 GHz NAN channel as the base channel, according to some embodiments. As shown, the base schedule, for each 512 TU frame, may include a first discovery window on channel 6 (e.g., 2.4 GHz channel), an inter discovery window (e.g., a window between NAN discovery windows in a frame) on channel 149 (e.g., 5 GHz channel), a second discovery window on channel 149, and a post discovery window (e.g., a window after NAN discovery windows in a frame). In some embodiments, the inter discovery window and post discovery windows may be considered as base windows for the base schedule. The discovery windows may be 16 TUs each, the inter discovery window may be 112 TUs, and the post discovery window may be 368 TUs.

FIG. 6B illustrates an example use of an infra channel as the base channel, according to some embodiments. As shown, the base schedule, for each 512 TU frame, may include a fist discovery window on channel 6 followed by an inter discovery window on the infra channel, a second discovery window on channel 149, and, finally, a post discovery window on the infra channel. In some embodiments, the discovery windows may be 16 TUs each, the inter discovery window may be 112 TUs and the post discovery window may be 368 TUs.

FIG. 6C illustrates an example use of a selected channel as the base channel, according to some embodiments. As shown, the base schedule, for each 512 TU frame, may include a fist discovery window on channel 6 followed by an inter discovery window on a selected channel, a second discovery window on channel 149, and, finally, a post discovery window on the selected channel. In some embodiments, the discovery windows may be 16 TUs each, the inter discovery window may be 112 TUs and the post discovery window may be 368 TUs.

Additionally, as illustrated in FIGS. 7A-7B, a scheduler may use multiple base channels, e.g., 2.4 and 5 GHz channels (channels 6 and 149, respectively), and may assign portions of the inter discovery windows and portions of the post discovery windows to each of the multiple base channels, according to some embodiments.

As shown in FIG. 7A, the base schedule, for each 512 TU frame, may include a first discovery window on channel 6 followed by a first portion of an inter discovery window on channel 6 and a second portion of the inter discovery window on channel 149. Further, the base schedule may include a second discovery window on channel 149 followed by a post discovery window on channel 149. Note that the inter discovery window may or may not be split proportionately (and/or equally) between channels. In some embodiments, the discovery windows may be 16 TUs each, the inter discovery window may be 112 TUs split between channels 6 and 149 (e.g., a first portion may be 48 TUs and a second portion may be 64 TUs), and the post discovery window may be 368 TUs.

As shown in FIG. 7B, the base schedule, for each 512 TU frame, may include a first discovery window on channel 6 followed by a first portion of an inter discovery window on a first selected channel and a second portion of the inter discovery window on second selected channel. Further, the base schedule may include a second discovery window on channel 149 followed by a first portion of a post discovery window on the first selected channel and a second portion of the post discovery window on the second selected channel. Note that the inter discovery window may or may not be split proportionately (and/or equally) between channels and the post discovery window may or may not be split proportionately (and/or equally) between channels. In some embodiments, the discovery windows may be 16 TUs each, the inter discovery window may be 112 TUs split between the first and second selected channels (e.g., a first portion may be 48 TUs and a second portion may be 64 TUs), and the post discovery window may be 368 TUs split between the first and second selected channels (e.g., a first portion may be 112 TUs and a second portion may be 256 TUs).

Alternatively, as illustrated in FIGS. 8A-8B, the inter discovery window may be assigned to a first base channel and the post discovery window may be assigned to a second base channel when multiple base channels are employed, according to some embodiments.

As shown in FIG. 8A, the base schedule, for each 512 TU frame, may include a first discovery window on channel 6 followed by an inter discovery window on channel 6. Further, the base schedule may include a second discovery window on channel 149 followed by a post discovery window on channel 149. In some embodiments, the discovery windows may be 16 TUs each, the inter discovery window may be 112 TUs, and the post discovery window may be 368 TUs.

As shown in FIG. 8B, the base schedule, for each 512 TU frame, may include a first discovery window on channel 6 followed by an inter discovery window on a first selected channel. Further, the base schedule may include a second discovery window on channel 149 followed by a post discovery window on a second selected channel. In some embodiments, the discovery windows may be 16 TUs each, the inter discovery window may be 112 TUs, and the post discovery window may be 368 TUs.

In some embodiments, to avoid channel switching overhead, a NAN device that participates in one or more active datapaths may skip a NAN discovery beacon transmission on a 2.4 GHz NAN channel (if it is in master role), but may still participate in 2.4 GHz discovery windows, may skip all 2.4 GHz NAN synchronization and discovery operations, and/or may skip NAN discovery beacon transmissions on a 5 GHz NAN channel (if it is in master role), but still participate in 5 GHz discovery windows.

FIGS. 9A-9B illustrate various base schedule formats incorporating a device's visiting individual schedule, according to some embodiments. In some embodiments, a NAN device may initially place a flexible visiting window at an end of a frame and occupy part or all of a post discovery window. The flexible visiting window may be defined (or designated) using a duration and period. In some embodiments, the duration and period of the flexible visiting window may be varied based on traffic demand associated with data links of the NAN device. In some embodiments, the period may be an integer number of frames (e.g., discovery window intervals). Additionally, in some embodiments, there may be a size limit of the flexible visiting window within each frame. For example, in some embodiments, the flexible visiting window may not extend (from the end of a frame backward) beyond the end of the 5 GHz discovery window (e.g. the flexible visiting window can at most occupy the entire post discovery window). In some embodiments, the flexible visiting window may be extended from the end of the frame to occupy both the post discovery window and the inter discovery window. In some embodiments, the flexible visiting window may be extended to occupy the entire post discovery window, as well as a portion of the inter discovery window, except for a first unit (16 TU) of the inter discovery window. In other embodiments, the flexible visiting window may be extended to cover the 5 GHz discovery window if a NAN device does not want to perform NAN discovery and synchronization during the 5 GHz discovery window.

Thus, as shown in FIG. 9A, a base schedule, for a 512 TU frame, may include a first discovery window on channel 6 (e.g., 2.4 GHz channel) followed by an inter discovery window on channel 149 (e.g., 5 GHz channel). Further, the base schedule may include a second discovery window on channel 149 followed by a post discovery window on channel 149. In addition, a portion of the post discovery window may include a flexible visiting window on the infra channel. Note that the flexible visiting window may extend back from the end of the 512 TU frame and may include a portion (or all) of the post discovery window. In some embodiments, the discovery windows may be 16 TUs each, the inter discovery window may be 112 TUs, the post discovery window may be 240 TUs, and the flexible visiting window may be 128 TUs.

FIG. 9B illustrates another base schedule with a flexible visiting schedule. As shown, the base schedule, for a 512 TU frame, may include a first discovery window on channel 6 followed by an inter discovery window on a selected channel. Further, the base schedule may include a second discovery window on channel 149 followed by a post discovery window on the selected channel. In addition, a portion of the post discovery window may include a flexible visiting window on the infra channel. Note that the flexible visiting window may extend back from the end of the 512 TU frame and may include a portion (or all) of the post discovery window. In some embodiments, the discovery windows may be 16 TUs each, the inter discovery window may be 112 TUs, the post discovery window may be 112 TUs, and the flexible visiting window may be 256 TUs.

In some embodiments, a NAN device may schedule non-periodic visiting windows. The non-periodic visiting windows may be used to conduct channel scanning. Note that in some embodiments, the NAN device may keep peer devices (e.g., peer devices with active datapaths) informed of the non-periodic visiting windows to allow the peer devices to switch to corresponding channels accordingly. In some embodiments, the NAN device may announce the non-periodic visiting windows in advance for a few discovery window intervals (e.g., with a count-down indication) or the NAN device may inform peer devices individually (e.g., with acknowledgement). In other words, the NAN device may announce (e.g., broadcast or individually inform) future non-periodic visiting windows one or more frames prior to an occurrence of the future non-periodic visiting windows.

FIG. 10 illustrates a base schedule with a non-periodic visiting window. As shown, the base schedule, for a 512 TU frame, may include a first discovery window on channel 6 (e.g., 2.4 GHz channel) followed by an inter discovery window on channel 149 (e.g., 5 GHz channel). Further, the base schedule may include a second discovery window on channel 149 followed by a post discovery window on channel 149. In addition, a portion of the post discovery window may include a non-periodic flexible visiting window. Note that the non-periodic flexible visiting window may extend back from the end of the 512 TU frame and may include a portion (or all) of the post discovery window and may be split between multiple channels (e.g., a first portion may be scheduled for a first channel, a second portion may be scheduled for a second channel, a third portion may be scheduled for a third channel, and so forth). In addition, channels visited during the non-periodic flexible visiting window may change from frame to frame (including duration on each channel visited). In some embodiments, frames may include discovery windows that may be 16 TUs each, inter discovery windows that may be 112 TUs each, post discovery windows that may be 112 TUs each, and a flexible visiting window that may be 256 TUs. The flexible visiting window may be split between multiple channels. Thus, as shown, in a first frame, a first portion of the flexible visiting window may be on a first scanning channel (e.g., scan channel 1) and a second portion of the flexible visiting window may be on a second scanning channel (e.g., scan channel 2) and in a second frame, the first portion of the flexible visiting window may be on a third scanning channel (e.g., scan channel 3) and the second portion of the flexible visiting window may be on a fourth scanning channel (e.g., scan channel 4).

FIGS. 11A to 11D illustrate methods for adjustment of a base schedule to incorporate a flexible visiting window, according to some embodiments. The methods exemplified by FIGS. 11A to 11D may be used in conjunction with any of the systems or devices shown in the above Figures, among other devices. In various embodiments, some of the method elements may be performed concurrently, in a different order than described, or may be omitted. Additional method elements may also be performed as desired.

Turning to FIG. 11A, at step 1101, a scheduler may select an initial base schedule as described above (e.g., based on announced preferences and availabilities of the scheduler and/or of a non-scheduler). As shown, for each frame (e.g., for each 512 TUs), the initial base schedule may include discovery windows (e.g., a first discovery window on 2.4 GHz channel and a second discovery window on 5 GHz channel as described above), an inter discovery window (e.g., on 2.4 GHz, 5 GHz, infra, and/or one or more selected channels as described above), a post discovery window (e.g., on 2.4 GHz, 5 GHz, infra, and/or one or more selected channels as described above), and a scheduler flexible visiting window at the end of the frame (e.g., on 2.4 GHz, 5 GHz, infra, and/or one or more selected channels as described above).

At step 1102, a peer device (e.g., a non-scheduler) may receive the initial base schedule from the scheduler and may modify the initial base schedule (modified base schedule) via placement of a peer flexible visiting window (e.g., on 2.4 GHz, 5 GHz, infra, and/or one or more selected channels as described above) during the post discovery window such that it does not overlap with the scheduler flexible visiting window. In other words, the flexible visiting windows of the scheduler and the peer device may not have conflicting time periods. In other embodiments, the flexible visiting windows may at least partially overlap in order to minimize channel switches.

At step 1103, the scheduler may receive the modified base schedule from the peer device and may update the initial base schedule to match the modified base schedule. Thus, an updated base schedule may include the peer flexible visiting window.

Turning to FIG. 11B, a method for adjustment of a base schedule may include defining a flexible visiting block that includes flexible visiting windows for a peer device, according to some embodiments. The flexible visiting block may be bounded (e.g., may be limited in duration). For example, a flexible visiting block may be bounded from the end of a frame backward to the end of the 5 GHz discovery window. As another example, a flexible visiting block may be bounded to, e.g., at most 16 time slots (or time units) from the end of the frame (backward). Note that other amounts of time slots, such as 4 or 8, are also contemplated. Additionally, the scheduler may update its availability schedule to accept/confirm the flexible visiting window placement of the peer device.

As shown, at step 1104, a scheduler may select an initial base schedule as described above (e.g., based on announced preferences and availabilities of the scheduler and/or of a non-scheduler). The initial base schedule may be defined for multiple frames. Each frame may include discovery windows (e.g., a first discovery window on 2.4 GHz channel and a second discovery window on 5 GHz channel as described above), an inter discovery window (e.g., on 2.4 GHz, 5 GHz, infra, and/or one or more selected channels as described above), and a post discovery window (e.g., on 2.4 GHz, 5 GHz, infra, and/or one or more selected channels as described above). An initial frame may also include a scheduler flexible visiting window at the end of the initial frame (e.g., on 2.4 GHz, 5 GHz, infra, and/or one or more selected channels as described above). However, a subsequent frame of the initial base may not include the scheduler flexible visiting window.

At step 1105, a peer device (e.g., a non-scheduler) may receive the initial base schedule from the scheduler and may modify the initial base schedule (modified base schedule) via placement of a peer flexible visiting window (e.g., on 2.4 GHz, 5 GHz, infra, and/or one or more selected channels as described above) during the post discovery window in the subsequent frame such that it does not overlap with the scheduler flexible visiting window. In other words, the flexible visiting windows of the scheduler and the peer device may not have conflicting time periods.

At step 1106, the scheduler may receive the modified base schedule from the peer device and may update the initial base schedule to match the modified base schedule. Thus, an updated base schedule may include the scheduler flexible visiting window in an initial frame and the peer flexible visiting window in the subsequent frame.

Turning to FIG. 11C, a method for adjustment of a base schedule may include defining a flexible visiting block that includes flexible visiting windows for multiple peer devices, according to some embodiments. In some embodiments, an availability schedule of a scheduler may include a flexible visiting block that may be bounded (e.g., the flexible visiting block may already include the entire window allotted for visiting) and may include the flexible visiting window of the scheduler and a flexible visiting window of a first peer device. In such embodiments, the scheduler may indicate its own flexible visiting window in its availability schedule (to differentiate its own flexible visiting window from the first peer device's flexible visiting windows). Further, since the flexible visiting block is bounded (no additional windows available within the flexible visiting block), a second peer device may be required to overlap (at least partially) its flexible visiting window with an existing flexible visiting window (either the scheduler's or the first peer device's). Note that it may be preferable to not overlap the flexible visiting window of the scheduler. Once the scheduler receives the flexible visiting window placement of the second peer device, the scheduler may, in response, keep its original flexible visiting window. However, the scheduler may not communicate with the second peer during the overlapped flexible visiting windows. Thus, the scheduler may change to the flexible visiting window of the second peer device. However, the scheduler may not communicate with the first peer device that occupies the overlapped flexible visiting window. Hence, the scheduler may divide the overlapped flexible visiting window into multiple sub-windows and may assign a sub-window to each of the peer devices so that it may communicate with both peer devices during the overlapped flexible visiting window.

As shown, at step 1107, a scheduler may select an initial base schedule as described above (e.g., based on announced preferences and availabilities of the scheduler and/or of one or more non-scheduler(s)). The initial base schedule may be defined for multiple frames. Each frame may include discovery windows (e.g., a first discovery window on 2.4 GHz channel and a second discovery window on 5 GHz channel as described above), an inter discovery window (e.g., on 2.4 GHz, 5 GHz, infra, and/or one or more selected channels as described above), and a post discovery window (e.g., on 2.4 GHz, 5 GHz, infra, and/or one or more selected channels as described above). The post discovery window may be fully allotted to a scheduler flexible visiting window (e.g., on 2.4 GHz, 5 GHz, infra, and/or one or more selected channels as described above) and a first peer (e.g., peer A) flexible visiting window (e.g., on 2.4 GHz, 5 GHz, infra, and/or one or more selected channels as described above).

At step 1108, a second peer device (e.g., peer B) may receive the initial base schedule from the scheduler and may modify the initial base schedule (modified base schedule) via placement of a second peer (e.g., peer B) flexible visiting window (e.g., on 2.4 GHz, 5 GHz, infra, and/or one or more selected channels as described above) during the post discovery window in the subsequent frame such that it does not overlap with the scheduler flexible visiting window. In other words, the flexible visiting windows of the scheduler and the second peer device may not have conflicting time periods. However, the flexible visiting windows of the first and second peer devices may have conflicting time periods.

At step 1109, the scheduler may receive the modified base schedule from the second peer device and may update the initial base schedule. In some embodiments, the scheduler may further modify the modified base schedule received from the second peer device such that the peer devices' flexible visiting window is split into multiple sub-windows (e.g., a first portion of the peer flexible visiting window is scheduled for the first peer device and a second portion of the peer flexible visiting window is scheduled for the second peer device). The scheduler may assign a sub-window to each of the peer devices and may communicate with both peer devices during the overlapped flexible visiting window.

Turning to FIG. 11D, a method for adjustment of a base schedule may include defining a flexible visiting block that includes all of a post discovery window, according to some embodiments. Thus, in some embodiments, a scheduler may extend a flexible visiting window to the end of the 5 GHz discovery window (e.g., occupy the entire post discovery window). Hence, a peer device may choose to overlap its flexible visiting window to a slot (e.g., sub-window) from the end of the 5 GHz discovery window to the end of the discovery window interval. In some embodiments, the scheduler may suggest to the peer device a placement of the peer device's flexible visiting window. For example, the scheduler may define three time slots (e.g., the scheduler may partition the post discovery window into three sub-windows) suggest the peer device place its flexible visiting window in a second slot such that the scheduler may have flexible visiting windows on alternate 128 TU slots (e.g., visit its infra channel on alternate 128 TU slots). Note that if the peer device chooses a first or third slot, a gap between the visits to the infra channel may increase to 256 TU which may cause connection time-out for some applications.

As shown, at step 1110, a scheduler may select an initial base schedule as described above (e.g., based on announced preferences and availabilities of the scheduler and/or of one or more non-scheduler(s)). The initial base schedule may be defined for multiple frames. Each frame may include discovery windows (e.g., a first discovery window on 2.4 GHz channel and a second discovery window on 5 GHz channel as described above), an inter discovery window (e.g., on 2.4 GHz, 5 GHz, infra, and/or one or more selected channels as described above), and a post discovery window (e.g., on 2.4 GHz, 5 GHz, infra, and/or one or more selected channels as described above). The post discovery window may be fully allotted to a scheduler flexible visiting window (e.g., on 2.4 GHz, 5 GHz, infra, and/or one or more selected channels as described above).

At step 1111, a peer device may receive the initial base schedule from the scheduler and may modify the initial base schedule (modified base schedule) via placement of a peer flexible visiting window (e.g., on 2.4 GHz, 5 GHz, infra, and/or one or more selected channels as described above) during the post discovery window. In some embodiments, the scheduler may sub-divide (or partition) the post discovery window into one or more sub-windows and may suggest a first sub-window of the one or more sub-windows for the peer flexible visiting window. For example, the scheduler may sub-divide the post discovery window into three sub-windows (first, second, and third sub-windows) and suggest the peer device schedule the peer flexible visiting window during the second sub-window.

At step 1112, the scheduler may receive the modified base schedule from the second peer device and may update the initial base schedule. Thus, an updated base schedule may include the scheduler flexible visiting window in one or more sub-windows of the post discovery window and the peer flexible visiting window in one of the sub-windows of the post discovery window FIGS. 12A to 12B illustrate embodiments in which a base schedule may include inflexible visiting schedules. In some embodiments, periodic inflexible visiting windows may be represented by parameters including an offset parameter (e.g., TFS 0), a period parameter, a duration parameter, a countdown to end parameter, and a channel information parameter. The offset parameter may indicate an offset between TSF 0 and a starting time of a first inflexible visiting window. The period parameter may indicate a repeating period of the inflexible visiting window. The duration parameter may indicate a duration (e.g., a number of time units) of each inflexible visiting window. The countdown to end parameter may indicate a countdown value to a last inflexible visiting window. The channel information parameter may indicate channel information such as operating class, channel number, and availability flag.

In some embodiments, there may be three types of inflexible visiting windows. A first type may indicate availability for NAN communication only on a particular channel. The first type may be indicated by the channel information field with the operating class and channel number pointing to the visiting channel and the availability flag set to 1. A second type may indicate unavailability for NAN communication if a current operating channel is on a certain band and/or channel. The second type may be indicated by the channel information field with operating class pointing to the prohibited band, channel number pointing to the prohibited channel (and set to 0 if the whole band is prohibited), and the availability flag set to 0. A third type may indicate unavailability for NAN communication. The third type may be indicated by the channel information field with operating class, channel number, and availability flag all set to zero. Note that a device that schedules inflexible visiting windows may transmit a trigger frame before a visiting window to inform/remind peer devices that it may be unavailable at the current channel until the end of the window. This may also be used for unscheduled/dynamic visiting windows. In some embodiments, the trigger frame nay include window ending time (or duration to window ending time) and visiting channel information.

Thus, as shown in FIG. 12A, a base schedule, for an initial 512 TU frame, may include a first discovery window on channel 6 (e.g., 2.4 GHz channel) followed by an inter discovery window on channel 149 (e.g., 5 GHz channel). The inter discovery window may be divided by a first inflexible visiting window on the infra channel into a first portion (before the first inflexible visiting window) and a second portion (after the first inflexible visiting window). The second portion of the inter discovery window may be followed by a second discovery window on channel 149 followed by a post discovery window on channel 149. In addition, the post discovery window may be divided by a second inflexible visiting window on the infra channel into a first portion (before the second inflexible visiting window) and a second portion (after the second inflexible visiting window). Note that the inflexible visiting window may be defined by parameters including an offset parameter, a period, and a duration. In some embodiments, the discovery windows may be 16 TUs each, the inflexible visiting windows may be 64 TUs each, the inter discovery window may include a 48 TU portion and a 16 TU portion, and the post discovery window may include a 208 TU portion and a 96 TU portion.

Note that based on the parameters defining the inflexible visiting window, a subsequent frames may not repeat the scheduling of the initial 512 TU frame. Thus, as shown in FIG. 12A, a subsequent frame may include a first discovery window on channel 6 (e.g., 2.4 GHz channel) followed by an inter discovery window on channel 149 (e.g., 5 GHz channel) and a second discovery window on channel 149. The second discovery window may be followed by a post discovery window on channel 149. In addition, the post discovery window may be divided by first and second inflexible visiting windows on the infra channel into a first portion (before the first inflexible visiting window) and a second portion (after the first inflexible visiting window and before the second inflexible visiting window). In some embodiments, the discovery windows may be 16 TUs each, the inflexible visiting windows may be 64 TUs each, the inter discovery window may be 112 TUs, and the post discovery window may include a 16 TU portion and a 224 TU portion.

FIG. 12B illustrates another base schedule which may include inflexible visiting windows. As shown, for an initial 512 TU frame, the base schedule may include a first discovery window on channel 6 (e.g., 2.4 GHz channel) followed by an inter discovery window on channel 149 (e.g., 5 GHz channel) and a second discovery window on channel 149. The second discovery window may be followed by a first portion of a post discovery window on channel 149 and a second portion of the post discovery window on channel 6. In addition, the base schedule may include an inflexible visiting schedule for the 2.4 GHz band (e.g., channel 6). The inflexible visiting window may be defined by parameters including an offset parameter, a period, and a duration. Thus, based on the parameters of the inflexible visiting window, the second portion of the post discovery window on channel 6 may be sub-divided since it coincides with an inflexible visiting window scheduled for the 2.4 GHz band, however, the inter discovery window on channel 149 may not be sub-divided even though it also coincides with an inflexible visiting window. In some embodiments, the discovery windows may be 16 TUs each, the inflexible visiting windows may be 64 TUs each, the inter discovery window may be 112 TUs, and the post discovery window may include a 112 TU portion on channel 149, two 112 TU portions on channel 6.

Note that based on the parameters defining the inflexible visiting window, a subsequent frames may not repeat the scheduling of the initial 512 TU frame. Thus, as shown in FIG. 12B, a subsequent frame may include a first discovery window on channel 6 (e.g., 2.4 GHz channel) followed by an inter discovery window on channel 149 (e.g., 5 GHz channel) and a second discovery window on channel 149. The second discovery window may be followed by a first portion of a post discovery window on channel 149 and a second portion of the post discovery window on channel 6. The second portion of the post discovery window on channel 6 may be followed by an inflexible visiting window. In some embodiments, the discovery windows may be 16 TUs each, the inflexible visiting windows may be 64 TUs each, the inter discovery window may be 112 TUs, and the post discovery window may include a 112 TU portion on channel 149 and a 224 TU portion on channel 6.

In some embodiments a device may adapt to a peer device's inflexible visiting windows in order to gain more communication opportunities or to save power while the peer device is unavailable. For example, a device may switch to a peer's visiting channels during some, or all, of the peer's visiting windows or just partial periods of the visiting windows.

Figure 13:
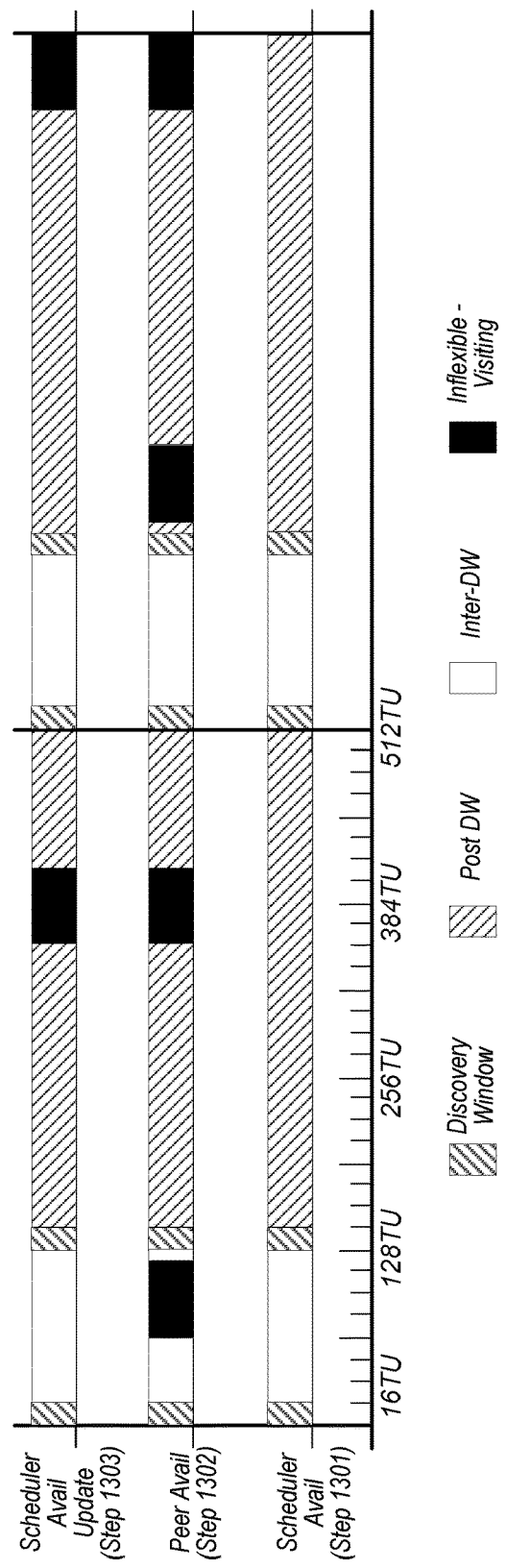
FIG. 13 illustrates an example method for adjustment of a base schedule to incorporate an inflexible visiting schedule, according to some embodiments.

FIG. 13 illustrates a method for adjustment of a base schedule to incorporate an inflexible visiting window, according to some embodiments. The method exemplified by FIG. 13 may be used in conjunction with any of the systems or devices shown in the above Figures, among other devices. In various embodiments, some of the method elements may be performed concurrently, in a different order than described, or may be omitted. Additional method elements may also be performed as desired.

At step 1301, a scheduler may select an initial base schedule as described above (e.g., based on announced preferences and availabilities of the scheduler and/or of a non-scheduler). As shown, for each frame (e.g., for each 512 TUs), the initial base schedule may include discovery windows (e.g., a first discovery window on 2.4 GHz channel and a second discovery window on 5 GHz channel as described above), an inter discovery window (e.g., on 2.4 GHz, 5 GHz, infra, and/or one or more selected channels as described above), and a post discovery window (e.g., on 2.4 GHz, 5 GHz, infra, and/or one or more selected channels as described above).

At step 1302, a peer device (e.g., a non-scheduler) may receive the initial base schedule from the scheduler and may modify the initial base schedule (modified base schedule) via placement of inflexible visiting windows (e.g., on 2.4 GHz, 5 GHz, infra, and/or one or more selected channels as described above) based on parameters of the inflexible visiting window (e.g., offset, duration, period, channel). The inflexible visiting windows may occur during either or both of the inter discovery window and post discovery window.

At step 1303, the scheduler may receive the modified base schedule from the peer device and may update the initial base schedule with information from the modified base schedule as illustrated.

Figure 14:
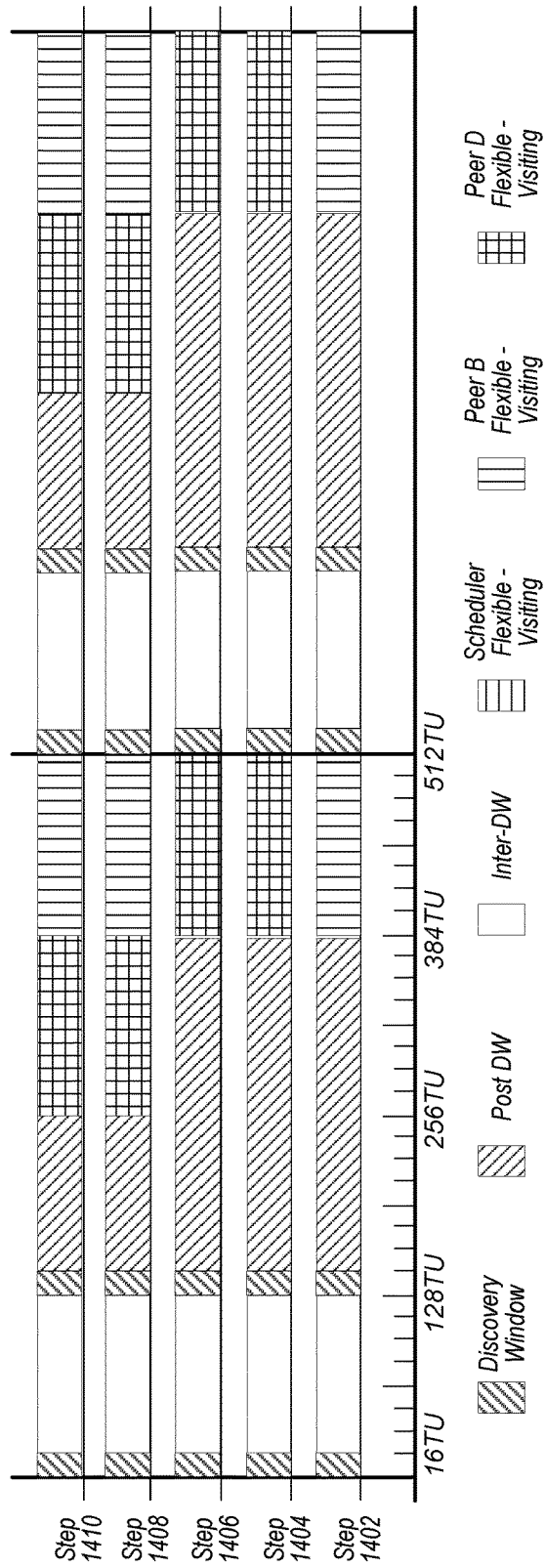
FIG. 14 illustrates an example method for base schedule merging, according to some embodiments.

As discussed above in reference to FIGS. 4A and 4B, after sets of NAN devices establish datapaths (e.g., devices A and B establish datapath A-B and devices C and D establish datapath C-D), NAN devices from each set may establish another datapath (e.g., devices B and D establish datapath B-D). FIG. 14 illustrates a method for base schedule merging, according to some embodiments. The method exemplified by FIG. 14 may be used in conjunction with any of the systems or devices shown in the above Figures, among other devices. In various embodiments, some of the method elements may be performed concurrently, in a different order than described, or may be omitted. Additional method elements may also be performed as desired.

As shown, at step 1401, a first scheduler (e.g., NAN device A) may determine a first base schedule with a first peer device (e.g., NAN device B). The first base schedule (e.g., the schedule for the datapath A-B of FIGS. 4A and 4B) may include, for each frame (e.g., for each 512 TUs), discovery windows (e.g., a first discovery window on 2.4 GHz channel and a second discovery window on 5 GHz channel as described above), an inter discovery window of a first channel (e.g., on 2.4 GHz, 5 GHz, infra, and/or one or more selected channels as described above), a post discovery window on a second channel (e.g., on 2.4 GHz, 5 GHz, infra, and/or one or more selected channels as described above), and a peer flexible visiting window on a third channel at the end of the frame (e.g., on 2.4 GHz, 5 GHz, infra, and/or one or more selected channels as described above). Note that the first, second, and third channels may or may not be different channels.

At step 1402, a second scheduler (e.g., NAN device C) may determine a second base schedule with a second peer device (e.g., NAN device D). The second base schedule (e.g., the schedule for the datapath C-D of FIGS. 4A and 4B) may include, for each frame (e.g., for each 512 TUs), discovery windows (e.g., a first discovery window on 2.4 GHz channel and a second discovery window on 5 GHz channel as described above), an inter discovery window of a fourth channel (e.g., on 2.4 GHz, 5 GHz, infra, and/or one or more selected channels as described above), a post discovery window on a fifth channel (e.g., on 2.4 GHz, 5 GHz, infra, and/or one or more selected channels as described above), and a peer flexible visiting window on a sixth channel at the end of the frame (e.g., on 2.4 GHz, 5 GHz, infra, and/or one or more selected channels as described above). Note that the first, second, third, fourth, fifth, and sixth channels may or may not be different channels.

At step 1403, based on establishment of a new datapath between the first and second peer devices (e.g., datapath B-D), the second base schedule may be modified (modified second base schedule) such that the inter discovery window is rescheduled to the second channel.

At step 1404, the modified second base schedule may be further updated (updated second base schedule) to include both the first and second peer device's flexible visiting windows. In addition, the remaining portion of the post discovery window not used for flexible visiting windows may be rescheduled to the third channel.

At step 1405, the first base schedule may be updated by the second peer device (now a scheduler based on the addition of the new datapath) to match the updated second base schedule such that all devices share a common base schedule.

For example, after NAN devices B and D establish datapath B-D with NAN device B as the scheduler, NAN device D may merge to NAN device B's base schedule. First, device D may merge its inter discovery window schedule (step 1403) and may start communication with device B during the inter discovery window. Note that NAN device D may maintain communication with NAN device C during the post discovery window and flexible visiting window. Additionally, NAN device D may inform NAN device C to merge its inter discovery window schedule. Then, after NAN device C merges its inter discovery window schedule, NAN device D may merge its post discovery window schedule, adopt NAN device B's flexible visiting window, and add its own flexible visiting window (step 1404). NAN device D may then inform NAN device C to update its post discovery window and flexible visiting window. Further, NAN device D may announce its updated availability schedule to NAN device B and NAN device B may update its availability schedule by adding NAN device D's flexible visiting window (step 1405). Note that NAN device A may also update its schedule accordingly.

In some embodiments, if NAN device C and NAN device D do not have a common post discovery window or visiting window, NAN device D may divide the inter discovery window into two sub-windows, merge the first sub-window when the inter discovery window is merged, and merge the second sub-window when the post discovery window is merged.

In some embodiments, NAN device D may only merge its inter discovery window to NAN device B's base schedule, but preserve its previous communication channel with device C for the post discovery window. NAN device D may report this post discovery window as a flexible visiting window to NAN device B. The base window of datapath B-D may then be limited to the inter discovery window.

In some embodiments, NAN device D may merge part of its inter discovery window to NAN device B's base schedule and may preserve a previous communication channel with NAN device C for the remaining part of the inter-DW window as well as the post-DW window. The part of the inter-DW window and the post discovery window which are not merged to NAN device B's base schedule are reported by NAN device D to NAN device B as its flexible visiting windows.

Note that the above described embodiments may also incorporate and/or be used in multicast. A multicast source may have a higher scheduler rank than devices that serve as sinks only. Additionally, once a sink subscribes to a multicast source and adopts the multicast source's schedule, it may inherit the scheduler rank of the multicast source. Further, a multicast source may merge its schedule to a peer device's schedule if the peer device has a higher scheduler rank and if the multicast source intends to establish a unicast datapath with the peer device or if the peer device wants to subscribe to the multicast source.

Figure 15:
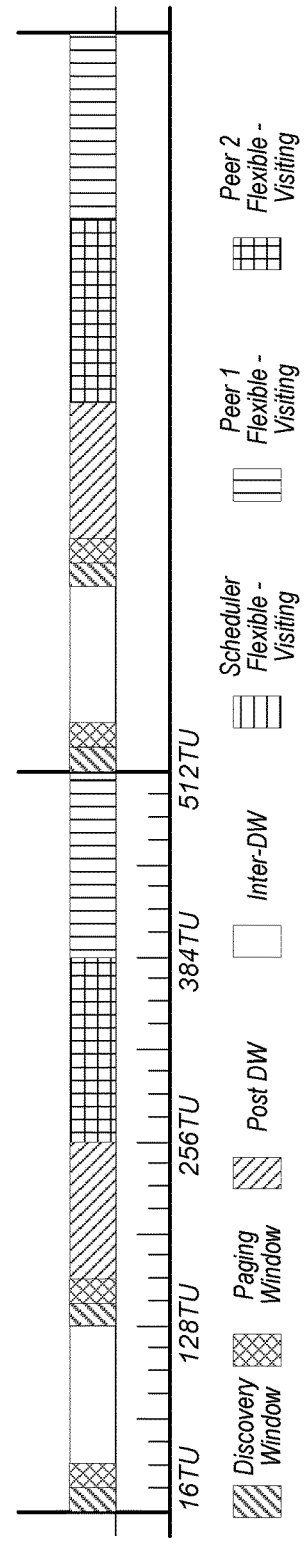
FIG. 15 illustrates an example base schedule incorporating paging windows, according to some embodiments.

Note further that the above described embodiments may also incorporate a paging window as illustrated in FIG. 15. Thus, all devices following a base schedule, i.e. the same inter discovery window/channel and/or post discovery window/channel may wake up periodically at paging windows. In some embodiments, a first portion of the devices may wake up at every paging window and a second portion of devices may wake up periodically, e.g., at every 2, 4, 8, or 16 paging windows. A paging window may be placed at the beginning of each inter discovery window for devices to maintain tight synchronization, probe pending data, transmit multicast frames, plan/schedule for the remaining portion of the inter discovery window interval, transition to new a schedule, and so forth. In some embodiments, an additional paging window may be placed following the 5 GHz discovery window if the first paging window is not sufficient to complete all tasks. Further, additional paging windows may also be placed at the beginning of some or all visiting windows, e.g. for devices to probe peer devices for pending data. Note that if a device determines that it does not have any pending data from/to all peer devices, it may skip the remaining portion of the window interval for power savings.

NAN Datapath Schedule Attributes

Figure 16:
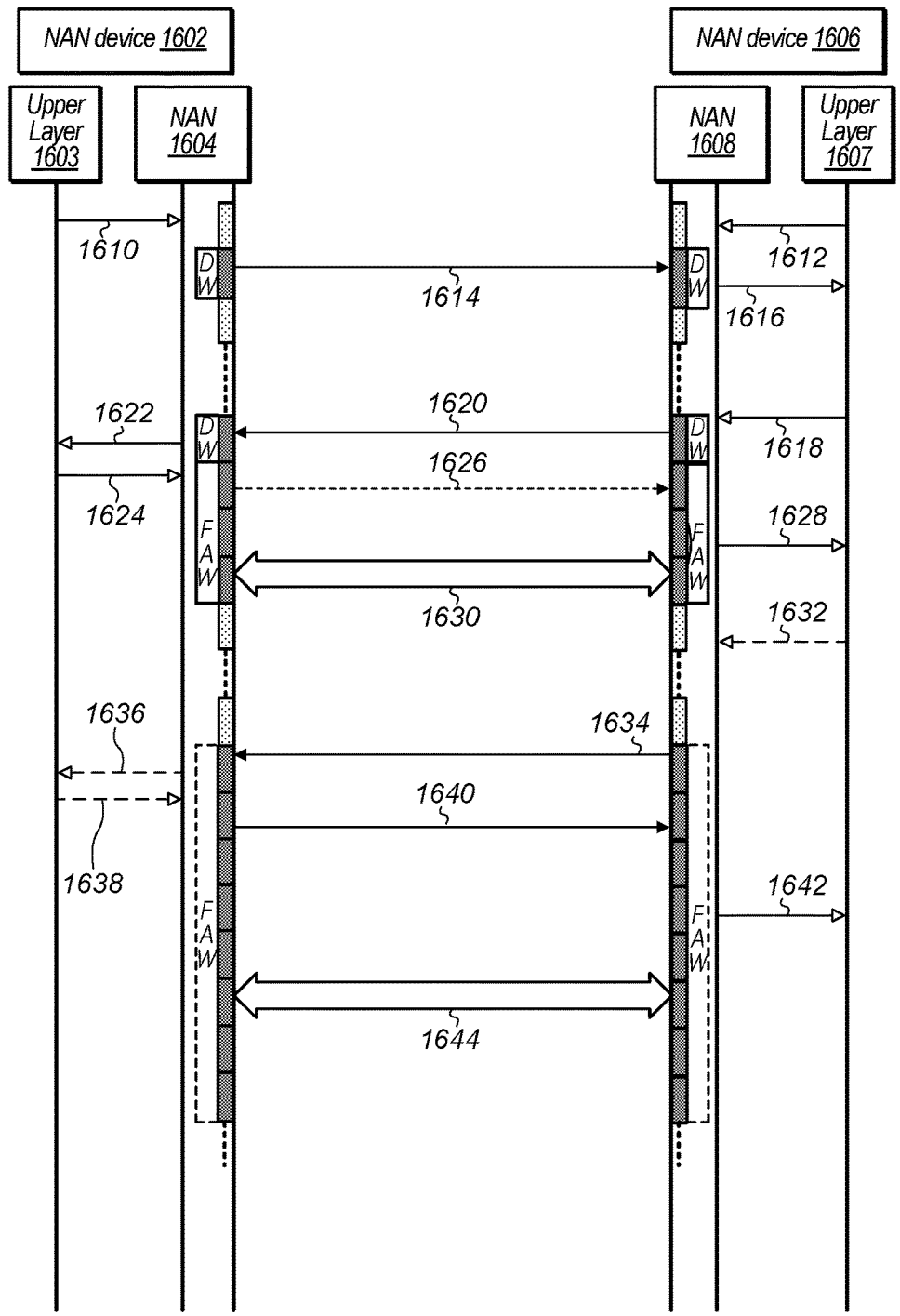
FIG. 16 illustrates an example NAN datapath setup procedure, according to some embodiments.

FIG. 16 illustrates an example NAN datapath setup procedure according to some embodiments. As shown, a publishing NAN device (e.g., NAN device 1602) may include at least one upper layer 1603 and a NAN layer 1604. Upper layer 1603 may send a publish request 1610 to NAN layer 1604, and, in an unsolicited publishing case, NAN layer 1604 may publish a service discovery frame 1614 (publish SDF) to a passively subscribing NAN device (e.g. NAN device 1606) in a first discover window (DW). Note that the subscribing NAN device may also include at least one upper layer 1607 and a NAN layer 1608 and upper layer 1607 may send a subscribe request 1620 to NAN layer 1608. In some embodiments, a publish SDF may be a multicast SDF, and may include one or more of the following scheduling attributes (parameters): a scheduler rank, base channel preferences and limitations, FAA/IAA with individual schedules, and FAA with existing base schedule.

Upon receipt of service discovery frame 1614, NAN layer 1608 may send a discovery result message 1616 to upper layer 1607. In response, upper layer 1607 may send a further service request 1618 to NAN layer 1608 and NAN layer 1608 may send further service request 1620 to NAN layer 1604 of NAN device 1602. Upon receipt, NAN layer 1604 may send a further service request message 1622 to upper layer 1603, and may receive a further service response message 1624 in response, and may then send a further service response 1626 to NAN layer 1608 of NAN device 1606. The further service response may be forwarded to upper layer 1607 via message 1628. In subsequent DWs (e.g., further availability windows (FAW), the NAN layers may exchange further service requests (FSReq) SDFs and further service response (FSRsp) SDFs (collectively messaging 1630) to discover and provide further service information between the devices. The FSReq SDFs and FSRsp SDFs may include a further availability attribute (FAA) for pre-datapath operations (PDO), which includes further service discovery and datapath setup.

Then, if the subscribing NAN device (e.g., NAN device 1606) decides to establish a datapath with the publisher (e.g., NAN device 1602), upper layer 1607 of NAN device 1606 may send a NAN connect session message 1632 to NAN layer 1608 and NAN layer 1608 may send a connect session request (CSR) SDF 1634 to the publishing NAN device. NAN layer 1604 may forward the connection request to upper layer 1603 via message 1636 and may receive a connection confirmation message 1638. In response, NAN layer 1604 may respond with a connect session confirm (CSC) SDF 1640 to NAN layer 1608. The confirmation may be forwarded to upper layer 1607 via message 1642.

The CSR SDFs may include one or more of a scheduler rank, base channel preference and limitations, FAA for PDO, FAA/IAA with individual schedules, and FAA with existing base schedules. The CSC SDF may include an initial FAA for datapath as well as a base schedule for the datapath. Subsequently, the NAN devices may exchange further availability update (FAU) SDFs (collectively messaging 1644). The FAU SDF may include updated FAA for the datapath. Each of these schedule attributes is described below in further detail.

In some embodiments, the scheduler rank (or scheduler rank attribute) may be maintained by each NAN device as described above. Additionally, the scheduler rank may include a schedule priority field and a tie break field. Thus, when a NAN device receives a scheduler rank from a peer device (e.g., a datapath candidate), it may determine its scheduling role for the datapath by comparing its own scheduler rank with the peer device's scheduler rank and the NAN device with higher scheduler rank becomes the scheduler. In some embodiments, the scheduler may propose the base schedule for the datapath. Additionally, the attribute may also include a sequence number or timestamp associated with the scheduler rank (e.g., as described above in reference to FIG. 5).

In some embodiments the base channel capability (or base channel capability attribute) may include NAN device limitations such as 2.4 GHz only or 2.4/5 GHz dual band and a not-supported channel list. Additionally, the base channel capability may include a preferred channel list which may be sorted from most preferred to least preferred. Each channel in the preferred channel list may have a channel score, as well as channel quality parameters such as channel load. Note that if the list is not present, it may indicate that the NAN device is unable to recommend any channel. Further, the base channel capability may include a not-preferred channel list. Each channel in the not-preferred channel list may have a channel score, as well as channel quality parameters such as channel load.

In some embodiments, the further availability attribute (FAA) may include one or more of a further availability map attribute, a post-NAN-discovery attributes such as a WLAN infrastructure attribute, a P2P operation attribute, and a further NAN service discovery attribute. Note that for NAN 2.0 devices (i.e., for datapaths), the further NAN service discovery attribute may be extended as a pre-datapath operation attribute, which may indicate the available slots for all pre-datapath operations (e.g., by using a NAN discovery interface). Additionally, the FAA may include a NAN datapath attribute which includes a bitmap to show the available time slots for NAN data interface. FIG. 17 illustrates an example of a bitmap showing available time slots for NAN data interface, according to some embodiments.

In some embodiments, the inflexible availability attribute (IAA) may include one or more of a TSF 0 offset parameter, a period parameter, a duration parameter, a countdown to end parameter, and a channel information parameter. The TSF 0 offset parameter may indicate an offset between TSF 0 and the starting time of a first inflexible availability window. The period parameter may indicate a repeating period of the inflexible availability windows. The duration parameter may indicate a duration of each inflexible availability window. The countdown to end parameter may indicate a countdown value to the last inflexible availability window. The channel information parameter may indicate one or more of operating class, channel number, and availability flag. Note that if a SDF includes both a FAA and an IAA, the IAA may be considered to be added on top of the FAA. Additionally, in some embodiments, if an inflexible availability window is overlapped with a further availability window, the inflexible availability window may take precedence.

In some embodiments, the base schedule attribute may include a base schedule for one or more base channels and one or more base windows. In some embodiments, once a base schedule is determined for a datapath, devices involved in the datapath may be available during base window(s) on associated base channel(s). Note that one exception may be that the two devices may cancel the remaining base windows on a base channel for a current DW interval if they do not have pending data to transmit. Additionally, once a base schedule is determined for a datapath, devices involved in the datapath may not overwrite the base schedule with their flexible individual schedules (indicated by FAA). Further, in some embodiments, devices may overwrite the base schedule with their inflexible individual schedules.

There may be at least two options for specifying a base schedule. In some embodiments a standard may specify a fixed base schedule (e.g., slot 2 and its associated channel). In such instances, the base schedule attribute may not be necessary. In other embodiments, in addition to the fixed base schedule defined by the standard, a scheduler may extend the base schedule to include a number of contiguous time slots on one or multiple base channels (e.g., extending the base schedule from slot 2 to slot 8). Additionally, in some embodiments, in addition to the fixed base schedule defined by the standard, a scheduler may extend the base schedule to include a number of non-contiguous and/or periodic base windows interleaved by individual availability windows.

In some embodiments, an updated FAA for NAN datapath may be received from either a scheduler or a non-scheduler. Thus, once a non-scheduler receives a proposed datapath schedule from the scheduler, the non-scheduler may accept the base schedule from the scheduler and continue the datapath setup or the non-scheduler may choose to reject the base schedule from the scheduler and stop the datapath setup. Note that based on the service resource requirements (a NAN internal scheduler may convert the radio resource requirements from services/applications, e.g., best effort, video streaming, or real time audio, among other services/applications, to NAN datapath schedule parameters, such as minimum required communication time slots and maximum allowed latency, among others), the non-scheduler may create/adjust its FAA to ensure that it may share a sufficient number of common time slots (on the common channels) with the scheduler and that the shared time slots fulfill the service latency requirements. In addition, the non-scheduler may also adjust its flexible individual schedules based on the scheduler's base schedule and individual schedules.

For example, the non-scheduler may choose to not overlap its flexible individual schedules with the scheduler's flexible individual schedules (e.g., so that both devices may switch together to each other's individual visiting channels and maintain continuous communications). On the other hand, once a scheduler receives the updated FAA from the non-scheduler, it may update its own availability schedules (beyond the base schedule) in order to make better use of the non-scheduler's availability schedules. For example, the scheduler may switch together with the non-scheduler to the non-scheduler's individual visiting channels, in order to maintain continuous communications with the non-scheduler.

FIGS. 18A-18D illustrate parameter (or attributes or schedule attributes) lists that may be included in each service discovery frame (SDF) type, according to some embodiments. For example, FIG. 18A illustrates a parameters list that may be included in each SDF type for the case of an unsolicited publish and passive subscribe, according to some embodiments. FIG. 18B illustrates a parameters list that alternatively may be included in each SDF type for the case of an unsolicited publish and passive subscribe, according to some embodiments. FIG. 18C illustrates a parameters list that may be included in each SDF type for the case of an active subscription and a solicited publish, according to some embodiments. FIG. 18D illustrates a parameters list that alternatively may be included in each SDF type for the case on an active subscription and a solicited publish, according to some embodiments.

In some embodiments, a NAN device may need to change, or update, its base schedule (e.g., as described above in reference to FIGS. 11A-11D, 13 and 14). For example, a NAN device may need to change (update) its base channel if the NAN device decides to establish a datapath with a peer NAN device where the peer NAN device is the scheduler and proposes a base schedule for the datapath with a different base channel from the NAN device's current base channel. As another example, if the NAN device decides to establish a datapath with a peer NAN device where the peer NAN device is the non-scheduler, but cannot operate at the NAN device's current base channel (e.g., due to a hardware limitation).

As yet another example, a NAN device may need to change its base windows if the NAN device decides to establish a datapath with a peer NAN device where the peer NAN device is the scheduler and proposes a base schedule for the datapath with different base windows from the device's current base windows. In another example, if the NAN device decides to establish a datapath with a peer NAN device where the peer NAN device is the non-scheduler, but cannot operate at the NAN device's current base channel (e.g., due to a hardware limitation) and, to accommodate the peer NAN device, the NAN device proposes a new base schedule (both base channel and base windows) to accommodate the peer NAN device. As another example, a NAN device may reuse an existing datapath with a NAN peer device to support a new/additional service; however, the new/additional service has higher radio resource requirements leading to a change in the base schedule.

Thus, in some embodiments, before a NAN device changes (updates) its base schedule, the NAN device may inform all datapath peers that may be impacted by the change and may attempt to move them to the new base schedule at a same time (i.e., concurrently or simultaneously, or an approximation thereof). The NAN device may include a schedule change attribute in at least one SDF (or a new management frame) in order to notify datapath peers of the change and to coordinate the update. The schedule change attribute may include at least one of a new further availability schedule (including both new base schedule and individual schedules) and a schedule change time (which can be a future time point or a countdown value). In response, any datapath peer that intends to maintain an existing datapath with the NAN device may switch to the new base schedule at the indicated schedule change time. In some embodiments, the NAN device may determine to multicast a frame that includes the schedule change attribute to all datapath peers until the schedule change time and/or unicast the frame that includes the schedule change attribute to datapath peers that have high priority data paths (e.g. low-latency datapaths) with the NAN device.

NAN Further Service Discovery

As discussed above, in some embodiments, NAN devices may exchange further service discovery requests (FSReq) SDFs and further server discovery response (FSRsp) SDFs. In embodiments, exchange of these SDFs may be due to a discovery window (DW) size limitation such that a publisher cannot transmit a large SDF within a DW. In other words, the publisher can only include some simple/short service information in the very first SDF. In response, a subscriber can transmit a follow-up SDF to the publisher to request more service information and the publisher can respond with a follow-up SDF with requested service information. However, current NAN specifications do not define a way for a publisher to transmit a very long service record by using multiple frames. Thus, in some embodiments, instead of defining a new fragmentation scheme at an above-NAN layer to enable a publisher to transmit a fragmented service record by using multiple SDFs, an existing further service discovery protocol, such as generic advertisement service (GAS) and/or access network query protocol (ANQP), may be leveraged for NAN further service discovery.

Hence, in some embodiments, a publisher that supports GAS may indicate this capability in its publish SDF. Then, when a subscriber receives the publish SDF and intends to request more service information, it may direct a GAS engine of the subscriber to start the GAS message exchanges with the publisher. In other words, the subscriber may initiate a GAS message exchange with the publisher based on content of the publish SDF. Note that prior to beginning a GAS message exchange, the subscriber and the publisher may ensure they share one or more common further availability time slots (on a same channel) beyond DWs, so that they may conduct GAS message exchanges during these common time slots. Note further that GAS messages may not be transmitted during DWs. In other words, the GAS message exchange may be scheduled as part of a NAN schedule.

In some embodiments, a NAN schedule for GAS may be a fixed schedule. The NAN 2.0 standard may specify fixed and minimum required schedules for GAS exchanges and other pre-datapath operations. Thus, for example, one or more time slots immediately following the 2.4 GHz DW (and/or 5 GHz DW) on the associated NAN channel may be reserved as negotiation windows. Additionally, a subscriber may request a publisher to be present at subsequent negotiation windows for pre-datapath negotiations and the publisher may reserve time slots associated with the negotiation window for the NAN channel and be present during the negotiation windows either always or upon request.

In some embodiments, a NAN schedule for GAS may be negotiated. Thus, if a publisher includes a FAA in a publish SDF, a subscriber may be present in one or more of the publisher's available slots (if possible) and transmit its own FAA to the publisher via the first follow-up frame. Accordingly, based on the FAA exchange, both devices may locate a set of common time slots (on common channel(s)) for pre-datapath operations. Note that when a device (publisher or subscriber) needs to update its availability schedule, the device transmit a SDF to the peer device with updated FAA. Alternatively, if the publisher does not include a FAA, or if the publisher includes a FAA but none of the available time slots are acceptable to the subscriber (for example, the publisher's FAA only includes 5 GHz channel, but the subscriber is 2.4 GHz only device), then the subscriber may:

(1) request the publisher to be present at subsequent negotiation windows and the publisher should show up during the negotiation windows upon request;

(2) include a preferred channel list and/or a un-supported channel list in its first follow-up frame, the publisher may include a FAA or updated FAA in a response follow-up frame to accommodate the subscriber's preferences/limitations, and then the subscriber may transmit another follow-up SDF with its updated FAA; and/or (3) the subscriber may include a recommended FAA in its first follow-up frame, the publisher may define/update its FAA to accommodate the subscriber's FAA and then transmit its updated FAA to the subscriber in a response follow-up frame.

Figure 19:
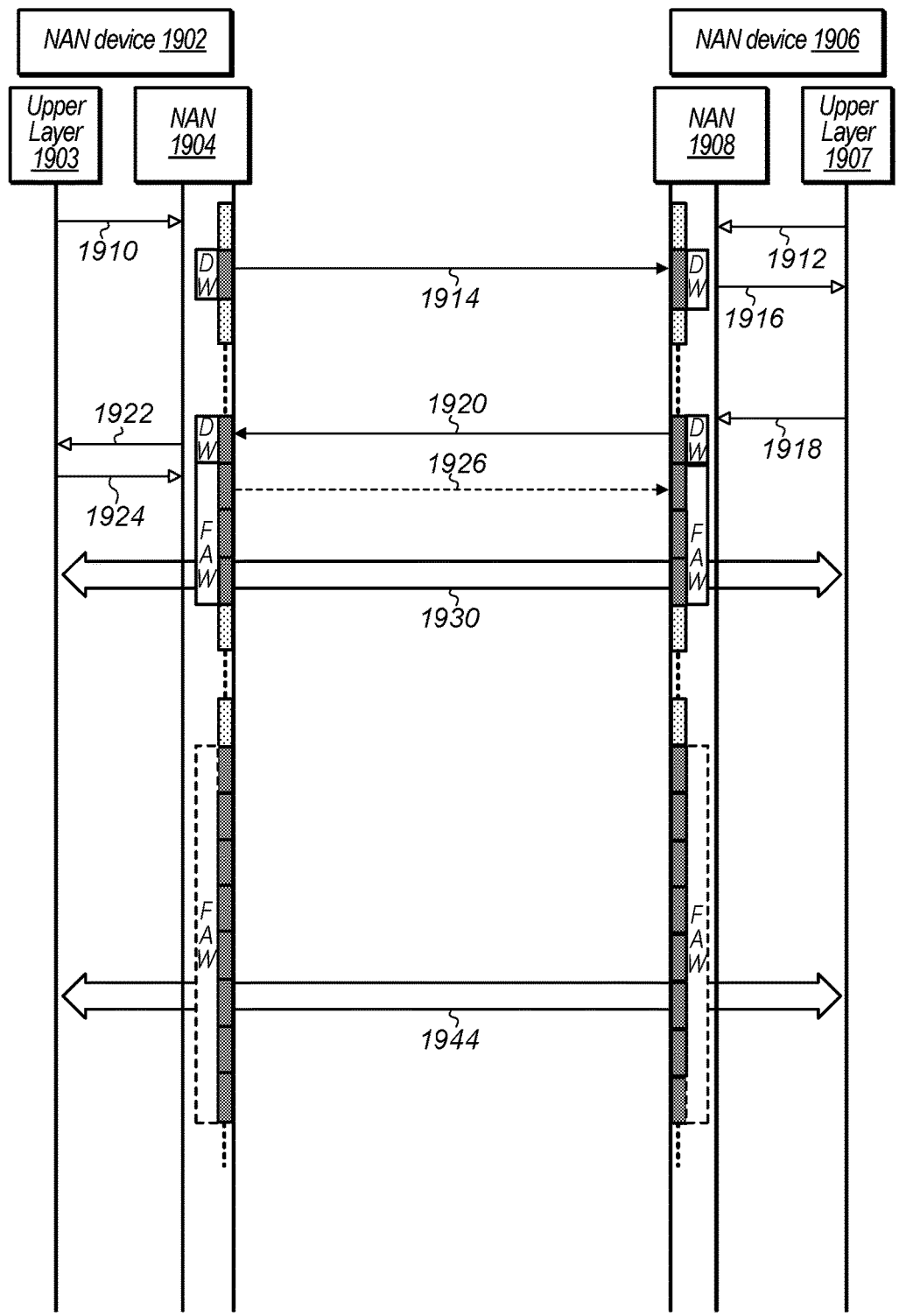
FIG. 19 illustrates an example NAN further service discovery procedure using GAS, according to some embodiments.

FIG. 19 illustrates an example NAN further service discovery procedure using GAS, according to some embodiments. As shown, a publishing NAN device (e.g., NAN device 1902) may include at least one upper layer 1903 and a NAN layer 1904. Upper layer 1903 may support or be a generic advertisement service (GAS) engine and may send a publish request 1910 to NAN layer 1904, and, in an unsolicited publishing case, NAN layer 1904 may publish a service discovery frame 1914 (publish SDF) to a passively subscribing NAN device (e.g. NAN device 1906) in a first discover window (DW). Note that the subscribing NAN device may also include at least one upper layer 1907 and a NAN layer 1908. Upper layer 1907 may be a GAS engine and may send a subscribe request 1920 to NAN layer 1908. In some embodiments, a publish SDF may be a multicast SDF, and may include one or more of the following scheduling attributes (parameters): a scheduler rank, base channel preferences and limitations, FAA/IAA with individual schedules, and FAA with existing base schedule.

Upon receipt of service discovery frame 1914, NAN layer 1908 may send a discovery result message 1916 to upper layer 1907. In response, upper layer 1907 may send a GAS request 1918 to NAN layer 1908 and NAN layer 1908 may send further service request 1920 (including the GAS request) to NAN layer 1904 of NAN device 1902. Upon receipt, NAN layer 1904 may send a GAS request message 1922 to upper layer 1903, and may receive a GAS response message 1924 in response, and may then send a further service response 1926 (including the GAS response) to NAN layer 1908 of NAN device 1906. The further service response may be forwarded to upper layer 1907 via GAS confirmation message 1928. In subsequent DWs (e.g., further availability windows (FAW), the upper layers may exchange GAS initiation messages (collectively 1930) to discover and provide further service information between the devices and in further subsequent DWs, the upper layers may exchange GAS request and response messages (collectively 1944) to establish the datapath.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
at least one antenna;
at least one radio configured to perform Wi-Fi communication with a Wi-Fi access point;
at least one processor in communications with the at least one radio;
wherein the at least one processor is configured to cause the wireless device to:
determine a first scheduler rank associated with the wireless device, wherein the first scheduler rank is based, at least in part, on a number of active datapaths;
detect a neighboring wireless device that is configured to perform peer-to-peer Wi-Fi communication;
determine to establish a datapath with the neighboring wireless device, wherein in response to determining to establish the datapath, the at least one processor is further configured to cause the wireless device to:
exchange, via peer-to-peer Wi-Fi communications, scheduling preferences and limitations with the neighboring wireless device, including receiving a second scheduler rank associated with the neighboring wireless device, wherein the second scheduler rank is based, at least in part, on a number of active datapaths of the neighboring wireless device; and
determine, based, at least in part, on a comparison of the first scheduler rank to the second scheduler rank, a scheduler for the datapath with the neighboring wireless device, wherein when the first scheduler rank is greater than the second scheduler rank, the wireless device is determined to be the scheduler;
wherein when the wireless device is the scheduler, the at least one processor is further configured to cause the wireless device to:
determine a base schedule for the datapath, wherein the base schedule is based, at least in part, on the scheduling preferences and limitations exchanged with the neighboring wireless device; and
send the base schedule to the neighboring wireless device.

2. The wireless device of claim 1,
wherein when the wireless device is not the scheduler, the at least one processor is further configured to cause the wireless device to receive the base schedule from the neighboring wireless device.

3. The wireless device of claim 1,
wherein the base schedule comprises time and channel information for one or more discovery windows, one or more inter discovery windows, and one or more post discovery windows.

4. The wireless device of claim 1,
wherein the at least one processor is further configured to cause the wireless device to maintain the first scheduler rank of the wireless device, wherein to maintain the first scheduler rank, the at least one processor is further configured to cause the wireless device to:
increase the first scheduler rank by a value based at least in part on a quality of service of an added datapath.

5. The wireless device of claim 1,
wherein the first scheduler rank comprises a schedule priority field and a tie break field.

6. The wireless device of claim 5,
wherein a value associated with the tie break field is a combination of a random number and a medium access control (MAC) address of the wireless device.

7. The wireless device of claim 1,
wherein the first scheduler rank comprises a schedule priority field, wherein the at least one processor is further configured to cause the wireless device to:
increase a value of the schedule priority field when the wireless device adds a datapath; and
decrease the value of the schedule priority field when the wireless device discontinues a datapath.

8. An apparatus, comprising:
a memory; and
at least one processor in communications with the memory, wherein the at least one processor is configured to:
determine a first scheduler rank associated with the apparatus, wherein the first scheduler rank is based, at least in part, on a number of active datapaths;
exchange, via peer-to-peer Wi-Fi communications and in response to determining to establish a datapath with a peer wireless station, scheduling preferences and limitations with the peer wireless station, including receiving a second scheduler rank associated with the peer wireless station, wherein the second scheduler rank is based, at least in part, on a number of active datapaths of the peer wireless station; and
determine, based, at least in part, on a comparison of the first scheduler rank to the second scheduler rank, a scheduler for the datapath with the peer wireless station, wherein when the first scheduler rank is greater than the second scheduler rank, the apparatus is determined to be the scheduler, and wherein when the apparatus is the scheduler, the at least one processor is further configured to:
determine a base schedule for the datapath, wherein the base schedule is based, at least in part, on the scheduling preferences and limitations exchanged with the peer wireless station; and
cause the base schedule to be transmitted to the peer wireless station.

9. The apparatus of claim 8,
wherein when the apparatus is not the scheduler, the at least one processor is further configured to receive the base schedule from the peer wireless station.

10. The apparatus of claim 8,
wherein the base schedule comprises time and channel information for one or more discovery windows, one or more inter discovery windows, and one or more post discovery windows.

11. The apparatus of claim 8,
wherein the at least one processor is further configured to maintain the first scheduler rank, wherein to maintain the first scheduler rank, the at least one processor is further configured to:
increase the first scheduler rank by a value based at least in part on a quality of service of an added datapath.

12. The apparatus of claim 8,
wherein the first scheduler rank comprises a schedule priority field, wherein the at least one processor is further configured to:
increase a value of the schedule priority field when a datapath is added; and
decrease the value of the schedule priority field when a datapath is discontinued.

13. The apparatus of claim 8,
wherein the first scheduler rank comprises a schedule priority field and-a tie break field.

14. The apparatus of claim 13,
wherein a value associated with the tie break field is a combination of a random number and a medium access control (MAC) address of the apparatus.

15. A non-transitory computer readable memory medium storing program instructions executable by processing circuitry of a wireless station to:
determine a first scheduler rank associated with the wireless station, wherein the first scheduler rank is based, at least in part, on a number of active datapaths;
exchange, via peer-to-peer Wi-Fi communications and in response to determining to establish a datapath with a peer wireless station, scheduling preferences and limitations with the peer wireless station, including receiving a second scheduler rank associated with the peer wireless station, wherein the second scheduler rank is based, at least in part, on a number of active datapaths of the peer wireless station; and
determine, based, at least in part, on a comparison of the first scheduler rank to the second scheduler rank, a scheduler for the datapath with the peer wireless station, wherein when the first scheduler rank is greater than the second scheduler rank, the wireless station is determined to be the scheduler, and wherein when the wireless station is the scheduler, the program instructions are further executable to:
determine a base schedule for the datapath, wherein the base schedule is based, at least in part, on the scheduling preferences and limitations exchanged with the peer wireless station; and
cause the base schedule to be transmitted to the peer wireless station.

16. The non-transitory computer readable memory medium of claim 15,
wherein when the wireless station is not the scheduler, the program instructions are further executable to receive the base schedule from the peer wireless station.

17. The non-transitory computer readable memory medium of claim 15,
wherein the base schedule comprises time and channel information for one or more discovery windows, one or more inter discovery windows, and one or more post discovery windows.

18. The non-transitory computer readable memory medium of claim 15,
wherein the program instructions are further executable to maintain the first scheduler rank, wherein to maintain the first scheduler rank, the program instructions are further executable to:

increase the first scheduler rank by a value based at least in part on a quality of service of an added datapath.

19. The non-transitory computer readable memory medium of claim 15,
wherein the first scheduler rank comprises a schedule priority field, wherein the program instructions are further executable to:
increase a value of the schedule priority field when a datapath is added; and
decrease the value of the schedule priority field when a datapath is discontinued.

20. The non-transitory computer readable memory medium of claim 15,
wherein the first scheduler rank comprises a schedule priority field and a tie break field.

* * * * *